United States Patent
Shoop

(10) Patent No.: US 11,277,659 B2
(45) Date of Patent: *Mar. 15, 2022

(54) SYSTEMS AND METHODS FOR NAVIGATING INTERNET APPLIANCES USING A MEDIA GUIDANCE APPLICATION

(71) Applicant: Rovi Guides, Inc., San Jose, CA (US)

(72) Inventor: David D. Shoop, San Jose, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/648,962

(22) PCT Filed: Oct. 25, 2017

(86) PCT No.: PCT/US2017/058243
§ 371 (c)(1),
(2) Date: Mar. 19, 2020

(87) PCT Pub. No.: WO2019/059954
PCT Pub. Date: Mar. 28, 2019

(65) Prior Publication Data
US 2020/0260135 A1 Aug. 13, 2020

Related U.S. Application Data

(60) Provisional application No. 62/560,654, filed on Sep. 19, 2017.

(51) Int. Cl.
*H04N 21/436* (2011.01)
*H04N 21/4782* (2011.01)
*G06F 16/73* (2019.01)
*G06F 16/738* (2019.01)
*H04N 21/482* (2011.01)
(Continued)

(52) U.S. Cl.
CPC ....... *H04N 21/43615* (2013.01); *G06F 16/73* (2019.01); *G06F 16/738* (2019.01);
(Continued)

(58) Field of Classification Search
CPC . G06F 16/73; G06F 16/738; H04N 21/43615; H04N 21/4858; H04N 21/4823;
(Continued)

(56) References Cited

U.S. PATENT DOCUMENTS 6,239,794 B1   5/2001 Yuen et al.
6,564,378 B1   5/2003 Satterfield et al.
(Continued)

OTHER PUBLICATIONS

PCT International Search Report and Written Opinion in connection with International Application No. PCT/US2017/058243, dated Jun. 7, 2018 (17 pages).

*Primary Examiner* — Jefferey F Harold
*Assistant Examiner* — Timothy R Newlin
(74) *Attorney, Agent, or Firm* — Haley Guiliano LLP

(57) ABSTRACT

Systems and methods for navigating through activity information using a media guidance application are provided. An Internet appliance is integrated with a plurality of content sources accessible to user equipment. A simultaneous display of a first plurality of media asset listings, corresponding to a first plurality of media assets transmitted by each of the plurality of content sources during a first time interval that includes the present time, and information received from the Internet appliance is generated. In response to a user request to navigate to a second time interval that precedes the present time, a simultaneous display of a second plurality of media asset listings, corresponding to a second plurality of media assets that were transmitted by each of the plurality of content sources during the second time interval, and a timeline that includes indicators representing activity detected by the Internet appliance during the second time interval is generated.

18 Claims, 18 Drawing Sheets

(51) Int. Cl.
    *H04N 21/442*     (2011.01)
    *H04N 21/472*     (2011.01)
    *H04N 21/462*     (2011.01)
    *H04N 21/41*     (2011.01)
    *H04N 21/431*     (2011.01)
    *H04N 21/485*     (2011.01)
    *H04N 7/18*     (2006.01)

(52) U.S. Cl.
    CPC ..... *H04N 21/4108* (2013.01); *H04N 21/4126* (2013.01); *H04N 21/4131* (2013.01); *H04N 21/4314* (2013.01); *H04N 21/4316* (2013.01); *H04N 21/44227* (2013.01); *H04N 21/44231* (2013.01); *H04N 21/4622* (2013.01); *H04N 21/472* (2013.01); *H04N 21/4782* (2013.01); *H04N 21/4821* (2013.01); *H04N 21/4823* (2013.01); *H04N 21/4858* (2013.01); *H04N 7/181* (2013.01)

(58) Field of Classification Search
    CPC ........... H04N 21/44227; H04N 21/472; H04N 21/4622; H04N 21/44231; H04N 21/4108
    See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,082,018 B1* | 7/2015 | Laska ............... G08B 13/19682 |
| 2002/0174430 A1 | 11/2002 | Ellis et al. |
| 2004/0168187 A1* | 8/2004 | Chang .................... H04N 7/163 |
| | | 725/40 |
| 2005/0174254 A1* | 8/2005 | Menez ................... H04N 5/765 |
| | | 340/13.27 |
| 2005/0251827 A1 | 11/2005 | Ellis et al. |
| 2008/0309759 A1* | 12/2008 | Wilson ............... H04N 21/8126 |
| | | 348/143 |
| 2009/0055868 A1* | 2/2009 | Wehmeyer ............ H04N 7/163 |
| | | 725/40 |
| 2010/0153885 A1 | 6/2010 | Yates |
| 2012/0221954 A1* | 8/2012 | Tanaka .................. G06F 16/248 |
| | | 715/736 |
| 2013/0107131 A1* | 5/2013 | Barnett ..................... H04N 5/60 |
| | | 348/734 |
| 2015/0163463 A1* | 6/2015 | Hwang .................. H04N 7/188 |
| | | 348/143 |
| 2015/0163535 A1* | 6/2015 | McCarthy, III ..... H04L 12/2803 |
| | | 725/49 |
| 2016/0021414 A1* | 1/2016 | Padi ................... H04N 21/4122 |
| | | 725/28 |
| 2017/0064412 A1* | 3/2017 | Taxier ................ H04N 21/4882 |
| 2017/0195612 A1* | 7/2017 | Yoon ................ H04N 21/43615 |
| 2018/0070136 A1* | 3/2018 | McCarthy, III .... H04N 21/4524 |
| 2019/0090014 A1 | 3/2019 | Shoop |
| 2020/0260135 A1* | 8/2020 | Shoop ..................... G06F 16/73 |

\* cited by examiner

1200

1210
Integrate a First Internet Appliance, External to User Equipment, with a Plurality of Content Sources Accessible to the User Equipment

1220
Generate a Simultaneous Display of a First Plurality of Media Asset Listings, Corresponding to a First Plurality of Media Assets Transmitted by Each of the Plurality of Content Sources During a First Time Interval that Includes the Present Time, and Information Received from the First Internet Appliance

1230
Receive a User Request to Navigate to a Second Time Interval that Includes a Period of Time that Precedes the Present Time

1240
In Response to Receiving the User Request, Generate a Simultaneous Display of a Second Plurality of Media Asset Listings, Corresponding to a Second Plurality of Media Assets that were Transmitted by Each of the Plurality of Content Sources During the Second Time Interval, and a First Timeline that Includes Indicators Representing Activity Detected by the First Internet Appliance During the Second Time Interval

FIG. 12

SYSTEMS AND METHODS FOR NAVIGATING INTERNET APPLIANCES USING A MEDIA GUIDANCE APPLICATION

CROSS-REFERENCE TO RELATED APPLICATIONS

This application is a national stage application under 35 U.S.C. § 371 of International Application PCT/US2017/058243, filed Oct. 25, 2017, which claims the benefit of U.S. Provisional Application No. 62/560,654, filed Sep. 19, 2017, which are hereby incorporated by reference herein in its their entireties.

BACKGROUND

Internet connected appliances and devices are now commonly used in every household. Users tend to rely on these devices to get notifications and monitor activity in real time throughout the day. Internet connected appliances and devices include cameras, doorbells, lights, motion sensors and any component that captures activity and sends the activity over the Internet to a remote server for a user to access using a website or application. The appliances may include mobile phone cameras that are capturing live video from a given user (e.g., a user's live feed).

Currently, in order to access activity or content provided by the appliances for different vendors, the user needs to access a website or application (app) associated with each vendor or appliance. For example, if a user is watching television and decides to view the activity of an Internet appliance, the program guide application has to be terminated in order to free up the resources to launch the application for the given Internet appliance. When the user wants to return to watching television, the given Internet appliance application has to be terminated to relaunch the program guide application and display the program the user was watching. Constantly switching contexts between the program guide application and the specific Internet appliance application in order to access desired content (from the program guide or from the Internet appliance) is tedious, inefficient and disrupts the viewing experience and enjoyment of the user.

SUMMARY

Accordingly, systems and methods for navigating Internet appliances using a media guidance application are provided. For example, the media guidance application may be implemented on user equipment (e.g., a set-top box). The media guidance application may search a user's home network to detect any available Internet appliances. The media guidance application may present a drag-and-drop interface to allow the user to select which of the detected devices to integrate with the content sources accessible by the user equipment. For example, once selected, the media guidance application may assign virtual channels to the selected detected Internet appliances and may treat those appliances as any ordinary content source (e.g., channel). Any functionality typically available for the user to perform with the content sources (e.g., television channels) may become available to the user to perform with the integrated Internet appliances.

In some embodiments, the media guidance application may present a grid guide that includes media asset listings for content received from a list of the content sources (e.g., television channels) and information that is received from any of the integrated Internet appliances. The user may browse through the listings and appliance information to view past content. For example, the user may request to view listings of content that was transmitted by the content sources on a previous day. The media guidance application may display, in the grid guide, those listings of the previously transmitted content on the previous day together with a timeline representing activity detected by the integrated Internet appliances on the previous day. The user may select any of the activities presented in the grid guide of the previously transmitted content to view content representing those activities. By unifying the information available from Internet appliances with content source information, the user is provided with a seamless browsing experience of accessing content without having to close one application (e.g., the media guidance application) to access content from another application (e.g., an app for a selected Internet appliance).

In some embodiments, a first Internet appliance, external to the user equipment, may be integrated with a plurality of content sources accessible to the user equipment. For example, the user may select a NEST video camera as the first Internet appliance that is detected in the home network. The media guidance application may assign a virtual channel (e.g., channel 102) determined to be available to the selected NEST video camera and thereby integrate the selected camera with other content sources (e.g., channels 1-100).

The media guidance application may generate a simultaneous display of a first plurality of media asset listings, corresponding to a first plurality of media assets transmitted by each of the plurality of content sources during a first time interval that includes the present time, and information received from the first Internet appliance. For example, the user may select an option to view a set of listings for the current time. In response, the media guidance application may present a grid guide that includes listings for a plurality of content sources (e.g., channels 1-100) and that includes information for the selected Internet appliance (e.g., the NEST video camera). The listings may represent content transmitted by the plurality of sources in the present time (e.g., today at 7 PM). The information for the selected Internet appliance may include current activity or lack thereof detected by the appliance, type of appliance, location information and/or video received from the Internet appliance.

The media guidance application may receive a user request to navigate to a second time interval that includes a period of time that precedes the present time. For example, the user may navigate a cursor to the left to reach an earlier time period (e.g., today at 5-6 PM) that precedes the current time (e.g., today at 7 PM). The media guidance application may, in response to receiving the user request to navigate to the previous time period, generate a simultaneous display of a second plurality of media asset listings, corresponding to a second plurality of media assets that were transmitted by each of the plurality of content sources during the second time interval, and a first timeline that includes indicators representing activity detected by the first Internet appliance during the second time interval. For example, the media guidance application may update the display to present listings of content transmitted earlier today between 5-6 PM by the plurality of sources. The media guidance application may display together with these past listings, a timeline representing activity detected by the selected Internet appliance. For example, the media guidance application may receive indications of motion/sounds detected by the NEST video camera along with timepoints at which the motion/ sounds were detected. The media guidance application may identify which of the motion/sounds were detected at the selected previous time of 5-6 PM. The media guidance application may present a timeline with indicators at each point between 5-6 PM at which the motion/sounds were detected as the information in the grid row for the selected Internet appliance. The indicators may differ depending on the type of activity they represent (e.g., red indicators may identify motion and blue indicators may identify sounds).

In some embodiments, in order to generate the timeline of activity detected by the first Internet appliance, the media guidance application may search a database associated with the first Internet appliance to identify activity detected by the first Internet appliance during the second time interval. For example, the media guidance application may transmit a request to a server associated with the selected Internet appliance. The request may identify the second time interval and request activity information (including any video clips) that was detected during the second time interval. For example, the media guidance application may contact the NEST server to obtain information about the NEST video camera that was selected as the first Internet appliance. The media guidance application may provide login credentials of the user associated with the NEST video camera. The NEST server may search its database for the requested content and return to the media guidance application the requested activity information. The media guidance application may assemble this information into a timeline including the appropriate indicators of activity. In some implementations, the media guidance application may contact the NEST video camera directly over the local network to obtain the information about the activity detected during the second time interval. The media guidance application may assemble this information received directly from the NEST video camera into a timeline including the appropriate indicators of activity.

In some embodiments, the media guidance application may perform a series of steps to integrate the selected Internet appliance. For example, the media guidance application may detect on a network local to the user equipment a plurality of Internet appliances. For example, the media guidance application may issue a discovery command over a local area network. Any Internet appliance that receives the discovery command may respond with its address and various other parameters (e.g., device ID, functions, manufacturer, etc.). The media guidance application may determine a type, identifier, and manufacturer of each of the detected plurality of Internet appliances based on an address of each of the detected plurality of Internet appliances received in the response to the discovery command. The media guidance application may generate for display in a first display region a list of detected Internet appliances that includes the first Internet appliance. For example, the media guidance application may present a dropdown menu listing each appliance that was detected along with the device parameters (e.g., device ID, manufacturer, functions, etc.). The user may provide login information to the media guidance application for each different manufacturer listed for each appliance that was detected.

The media guidance application may receive user input that drags the first Internet appliance from the first display region to a second display region. In response to receiving the user input dragging the identifier of the given appliance from one region of the display to the other, the media guidance application may identify a channel space of the user equipment that includes a plurality of content source channels associated with the plurality of content sources and a plurality of virtual channels associated with Internet appliances. For example, the media guidance application may access a stored list of channels that includes a set of channels provided by the user's cable provider and a list of virtual channels that are unassigned or available to use for external appliances. The channels provided by the cable provider allow access to content that is broadcast/cablecast by the content provider to multiple users at scheduled times. The virtual channels are channels that provide access to local user devices. The media guidance application may search the virtual channels to identify a first virtual channel that is not currently assigned to an Internet appliance. For example, the media guidance application may search the virtual channels to determine whether a stored indication is present for a given virtual channel identifying an Internet appliance associated with that channel. The media guidance application may modify the channel space to associate the first virtual channel with the first Internet appliance by associating a virtual channel number, the determined identifier, type, and/or manufacturer with the first Internet appliance.

In some implementations, the first Internet appliance may be a user's Internet video camera. For example, the first Internet appliance may be a NEST camera the user installed in their living room. The NEST camera may be a camera that continuously captures video and uploads the captured video to a NEST server for storage for a predetermined period of time (e.g., 10 days or longer based on a subscription). Access to the NEST camera feed is available to the user by logging in to the NEST app or website and selecting the designated camera (e.g., living room camera). In such implementations, the media guidance application may present, together with video received from a first of the content sources, a browse region in which content information is presented for a second of the content sources associated with a current channel number. For example, the media guidance application may present video that is being broadcast to a plurality of users and is being received on a given channel (e.g., NBC). The media guidance application may present a navigable region (e.g., as an overlay), together with the video that is being broadcast, that allows the user to view information for other channels (e.g., other content source channels or other virtual channels).

The media guidance application may receive user input to navigate to a subsequent content source in a list of content sources, wherein the subsequent content source is associated with a channel number that is higher or lower in a sequence of channels. For example, the media guidance application may present information (e.g., scheduling information including title and broadcast times of media assets) for channel 99 (e.g., a content source channel, FOX). The media guidance application may receive a user input to navigate to a higher channel (e.g., channel 100). The media guidance application may determine that the next higher channel (e.g., channel 100) is a virtual channel that is associated with the first Internet appliance. The media guidance application, in response, may present in the browse region information associated with the first Internet appliance and live video being received by the first Internet appliance. For example, the media guidance application may present identifier, type, and/or manufacturer of the first Internet appliance and a live video feed being captured by the first Internet appliance (e.g., in a window inside the browse region).

In some implementations, the media guidance application may receive a user request to perform a trick play operation on the live video presented in the browse region. In response to receiving the user request, the media guidance application retrieves stored video associated with the first Internet appliance that includes video captured by the first Internet appliance at a time in the past. For example, the media guidance application may determine the manufacturer associated with the first Internet appliance displayed in the browse region. The media guidance application may access stored user credentials associated with the manufacturer. The media guidance application may access the first Internet appliance (directly or via the server associated with the first Internet appliance) using the stored user credentials. For example, the media guidance application may communicate with the NEST server associated with the NEST camera to provide the user's credentials and request a stored video feed of video captured by the NEST camera. The stored video feed may be based on how far back the user rewinds the video shown in the browse region. In some implementations, the video feed from the first Internet appliance may be stored (periodically or continuously) on the user equipment on which the media guidance application is implemented (e.g., the DVR or set-top box). In such circumstances, in response to receiving the user request to perform the trick play operation on the video shown in the browse region, the media guidance application may retrieve and display in the browse region the stored video from the local storage device corresponding to the user requested position.

In some embodiments, the media guidance application may receive a user selection of an option to view a list of integrated Internet appliances including the first Internet appliance. For example, the media guidance application may receive a user selection of the MENU button on a remote control or a selection of a SHOW APPLIANCES button on a remote control. In response to receiving the selection, the media guidance application may determine a manufacturer of each integrated Internet appliance in the list. For example, the media guidance application may access a list of previously detected appliances on the local network. The media guidance application may retrieve from the list the stored manufacturer of each appliance. The media guidance application may generate a first set of integrated Internet appliances associated with a first manufacturer and a second set of integrated Internet appliances associated with a second manufacturer. For example, the media guidance application may identify all the detected appliances having the same first manufacturer (e.g., NEST) and generate a first set of Internet appliances associated with NEST (e.g., NEST camera 1, NEST camera 2, NEST doorbell, etc.). The media guidance application may identify all the detected appliances having the same second manufacturer (e.g., RING) and generate a first set of Internet appliances associated with RING (e.g., RING camera 1, RING doorbell, etc.).

The media guidance application may generate for display a plurality of rows, wherein a first of the plurality of rows is associated with the first manufacturer, and where a second of the plurality of rows is associated with the second manufacturer. The media guidance application may generate for display, in the first row, a first plurality of cells each representing content associated with each of the first set of integrated Internet appliances and generate for display, in the second row, a second plurality of cells each representing content associated with each of the second set of integrated Internet appliances. For example, in a row for the NEST manufacturer, the media guidance application may present three cells, one for each detected appliance associated with the NEST manufacturer (e.g., a cell for NEST camera 1, a cell for NEST camera 2, and a cell for NEST doorbell). For example, in a row for the RING manufacturer, the media guidance application may present two cells, one for each detected appliance associated with the RING manufacturer (e.g., a cell for RING camera 1, and a cell for RING doorbell). In each cell, the media guidance application may include any one of the following: live video captured by the corresponding appliance, information associated with the appliance, and/or an activity timeline of recent activity detected by the given appliance.

In some embodiments, the media guidance application may display video from a first of the content sources. For example, the media guidance application may present video that is being broadcast to a plurality of users and is being received on a given channel (e.g., NBC). The media guidance application may receive data from the first Internet appliance indicating that the first Internet appliance detected activity. For example, the NEST camera may transmit a notification to the NEST server indicating that motion was detected. In such circumstances, the media guidance application may periodically poll the NEST server to detect such activity that was reported to the NEST server. Alternatively, the NEST server may transmit notifications it receives from the NEST camera to the media guidance application associated with the user account. Alternatively, the NEST camera may transmit a notification to the media guidance application directly indicating that motion was detected. In response to detecting such activity, the media guidance application may present a notification associated with the first Internet appliance that includes the received data simultaneously with the video from the first of the content sources, wherein the data includes an image of the detected activity and a description of the detected activity. For example, the media guidance application may present an overlay on top of the television show video the user is viewing. The overlay may include information about the detected activity (e.g., motion was detected) and/or from which device/manufacturer the activity notification was received. In some circumstances, the media guidance application may automatically begin recording video captured by the appliance in response to detecting the activity. To do so, the media guidance application may tune to or access the virtual channel associated with the appliance and begin recording the content received over that channel in the same manner as typically done for recording television shows broadcast by a content source.

In some embodiments, the media guidance application may record a first media asset received from a first of the content sources. For example, the user may request that the media guidance application schedule for recording a television show being broadcast by a given content source at a particular time. When the particular time is reached, the media guidance application may automatically begin storing the television show received by the content source by accessing the channel associated with the content source. The media guidance application may receive a user selection of the information received from the first Internet appliance. For example, the media guidance application may receive a user selection of the cell displaying the name/identity associated with the first Internet appliance in a grid guide. In response to receiving the user selection, the media guidance application may generate for display an option to schedule for recording video received, at a designated future time, from the first Internet appliance on a local storage device of the user equipment. For example, the media guidance application may present options for the user to specify conditions for recording video captured by the first Internet appliance on the DVR used to record the content from the content source. For example, the user may specify that video be recorded if any combination of the following is met: a person is detected in the video that the appliance is capturing, the appliance is in a given location, a time of day is reached, an activity is detected, a user is detected in the video feed of the camera, an event is detected, a person is within a threshold distance of another object in the video feed from the camera or is within a threshold distance from the camera.

In response to receiving a user selection of the option to record, the media guidance application may record video received from the first Internet appliance when the criteria are met (e.g., at the user specified-time of day). In response to receiving a user request to view a directory of recorded content, the media guidance application may generate for display a first media listing associated with the first media asset that has been recorded and a recording indicator associated with the first Internet appliance indicating that the video from the first Internet appliance was recorded. For example, the media guidance application may display a list of all recorded programs and include in that list an identifier of the video captured by the selected appliance. The identifier may include the manufacturer of the camera and/or any of the criteria that caused the media guidance application to record the video captured by the camera. For example, the media guidance application may specify a name of a person or type of motion detected by the camera as the identifier of the video. The user may select the identifier in the list of recorded content to play back the clip of the video captured by the appliance and recorded by the media guidance application.

In some embodiments, the media guidance application may perform a series of steps to generate the simultaneous display of the second plurality of media asset listings and the first timeline that includes the indicators representing activity detected by the first Internet appliance during the second time interval. The media guidance application may search a database associated with a second Internet appliance to identify activity detected by the second Internet appliance during the second time interval, wherein the second Internet appliance is associated with a different manufacturer than the first Internet appliance, and wherein the second Internet appliance is of a different type than the first Internet appliance. For example, the user may select a RING doorbell from a list of detected appliances. In response, the media guidance application may access a RING server and/or the RING doorbell itself to retrieve activity detected by that appliance. For each identified activity, the media guidance application may retrieve, from the database associated with the second Internet appliance, a timepoint representing when the identified activity was detected by the second Internet appliance. For example, each detected activity may be assigned a range of time during which the activity was detected. In particular, the RING doorbell may detect a person in view of the doorbell between 5:34 PM-5:45 PM. As such, the RING doorbell may associate with this activity the timepoint 5:34-5:45 PM.

The media guidance application may generate a second timeline having a length corresponding to the second time interval. For example, if the user navigates back to the previous time period 5-6 PM, the media guidance application may generate a second timeline having a range of one hour representing activity that was detected by the second appliance between 5-6 PM. The media guidance application may add indicators to the second timeline at positions corresponding to the retrieved timepoints representing when the respective activity was detected by the second Internet appliance. For example, the media guidance application may add a first indicator of a first type (e.g., a blue line) for motion activity that was detected at a particular point (e.g., at 5:15 PM) and may add a second indicator of a second type (e.g., a red circle) for audio activity that was detected at a particular point (e.g., at 5:55 PM). The media guidance application may generate a simultaneous display of the second plurality of media asset listings, the first timeline that includes the indicators representing activity detected by the first Internet appliance during the second time interval, and a second timeline that includes indicators representing activity detected by a second Internet appliance during the second time interval.

In some embodiments, the media guidance application may navigate a cursor to a first indicator that represents a first activity detected by the first Internet appliance. For example, the user may press arrows on a remote control to navigate a cursor from a program listing representing previously transmitted content by the content source down to an activity indicator (e.g., motion activity detected by a NEST camera at 5:30 PM). The cursor may visually distinguish the selected activity indicator. The media guidance application may receive a user request to sequentially present content associated with the activities detected by the first and second Internet appliances starting from a point in time associated with the first indicator. For example, the user may select a PLAY button on a remote control while the cursor is positioned over the first indicator to instruct the media guidance application to generate a playlist of activities detected starting from the timepoint of the first indicator (e.g., 5:30 PM) to the current time (e.g., 7 PM) or to the end of the second time period that is displayed (e.g., 6 PM).

The media guidance application may generate for display content representing the first activity detected by the first Internet appliance. For example, the media guidance application may retrieve a locally stored clip associated with the selected activity or may access a NEST server and request a clip associated with the selected activity detected by the NEST camera at 5:30 PM. The media guidance application may determine that a second indicator that represents a second activity detected by the second Internet appliance is positioned between the first indicator and a third indicator that represents a third activity detected by the first Internet appliance. For example, the media guidance application may search all of the selected detected appliances and the activities represented in the simultaneous display for any activity that was detected and represented by a timeline following 5:30 PM. The media guidance application may determine that at 5:45 PM the RING doorbell detected an activity that is represented in the timeline in the simultaneous display. Accordingly, following presentation of the clip associated with the NEST camera of activity that was detected at 5:30 PM, the media guidance application may access and present a clip associated with the activity detected by the RING doorbell at 5:45 PM. In this manner, the media guidance application may generate a playlist of clips representing activities in a sequential and chronological manner across all of the detected and selected Internet appliances.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 12 and 13 are flowcharts of detailed illustrative processes for displaying Internet appliance timelines with content source media assets in accordance with some embodiments of the disclosure;

DETAILED DESCRIPTION

Figure 1:
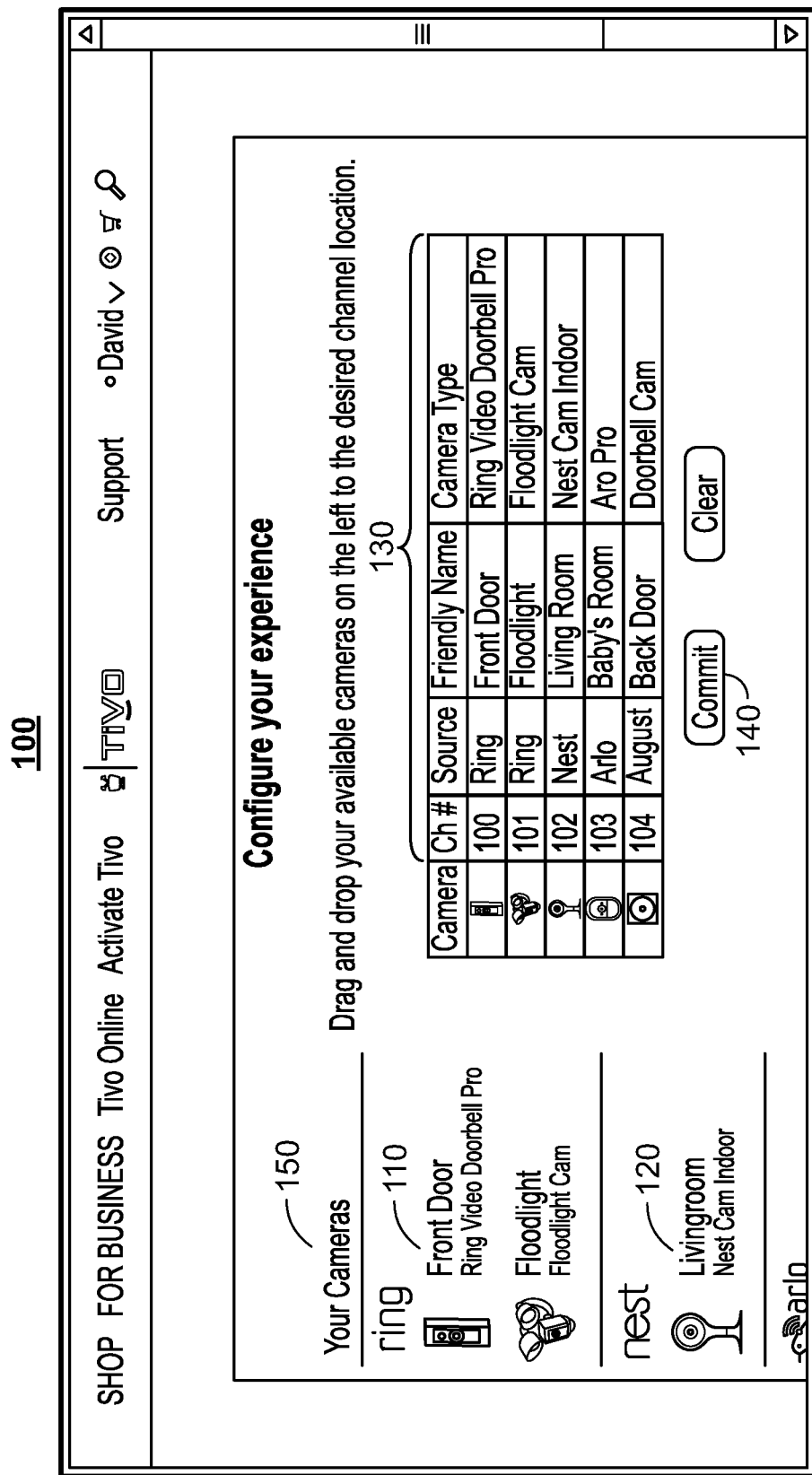
FIG. 1 shows an illustrative display screen for integrating Internet appliances in accordance with some embodiments of the disclosure.

Systems and methods for navigating to an Internet appliance using a media guidance application are provided. Below is an exemplary discussion of the disclosure with video camera appliances, however the teachings below apply in a similar manner to any Internet Protocol (IP) connected appliance. As referred to herein, the term "Internet appliance" should be understood to mean a user device that generates or captures content (e.g., video or audio) and makes that content accessible via the Internet through an account associated with the user. The content available from the Internet appliances is associated one-to-one with each user account. Namely, different user accounts cannot access the same Internet appliance. In some implementations, the content (live or previously captured/stored) is accessible via the Internet by directly accessing a storage device or content capture circuit of the Internet appliance. In some implementations, the content (live or previously captured/stored) is accessible via the Internet by accessing a server associated with the Internet appliance and which communicates with the Internet appliance to obtain the content. Particularly, the content may be stored and retrieved directly from the Internet appliance or via a server in communication with the Internet appliance. In some implementations, the server may store the content captured by the Internet appliance and make that content accessible via the Internet to a user or device. For example, Internet appliances may include cameras, doorbells, lights, motion sensors and any component that captures activity and sends the activity over the Internet.

For example, the media guidance application may be implemented on user equipment (e.g., a set-top box). The media guidance application may search a user's home network to detect any available Internet appliances. The media guidance application may present a drag-and-drop interface to allow the user to select which of the detected devices to integrate with the content sources accessible by the user equipment. For example, once selected, the media guidance application may assign virtual channels to the selected detected Internet appliances and may treat those appliances as any ordinary content source (e.g., channel). Any functionality typically available for the user to perform with the content sources (e.g., television channels) may become available to the user to perform with the integrated Internet appliances.

In some embodiments, the media guidance application may present a grid guide that includes media asset listings for content received from a list of the content sources (e.g., television channels) and information that is received from any of the integrated Internet appliances. For example, the media guidance application may display grid guides shown in FIGS. 6 and 7. The user may browse through the listings and appliance information to view past content. For example, the user may request to view listings of content that was transmitted by the content sources on a previous day. The media guidance application may display, in the grid guide, those listings of the previously transmitted content on the previous day together with a timeline representing activity detected by the integrated Internet appliances on the previous day. For example, the media guidance application may present the grid guide shown in FIG. 7 which includes the previously available/transmitted content. The user may select any of the activities presented in the grid guide of the previously transmitted content to view content representing those activities. By unifying the information available from Internet appliances with content source information, the user is provided with a seamless browsing experience of accessing content without having to close one application (e.g., the media guidance application) to access content from another application (e.g., an app for a selected Internet appliance).

In some embodiments, a first Internet appliance, external to user equipment, may be integrated with a plurality of content sources accessible to the user equipment. For example, the user may select a NEST video camera as the first Internet appliance that is detected in the home network. The media guidance application may assign a virtual channel (e.g., channel 102) determined to be available to the selected NEST video camera and thereby integrate the selected camera with other content sources (e.g., channels 1-100). FIG. 1 shows an illustrative display screen 100 for integrating Internet appliances in accordance with some embodiments of the disclosure.

For example, the media guidance application may detect on a network local to the user equipment a plurality of Internet appliances. For example, the media guidance application may issue a discovery command over a local area network. Any Internet appliance that receives the discovery command may respond with its address and various other parameters (e.g., device ID, functions, manufacturer, etc.). In particular, the media guidance application and each Internet appliance may implement a UPnP protocol and may be discovered in accordance with the UPnP protocol. Any other type of protocol may be used. The media guidance application may determine a type, identifier, and manufacturer of each of the detected plurality of Internet appliances based on an address of each of the detected plurality of Internet appliances received in the response to the discovery command. The media guidance application may generate for display in a first display region 150 a list of detected Internet appliances that includes a first Internet appliance 110 (e.g., a RING doorbell) and a second Internet appliance 120 (e.g., a NEST camera). In some implementations, the media guidance application may present a dropdown menu listing each appliance that was detected along with the device parameters (e.g., device ID, manufacturer, functions, etc.). The user may provide login information to the media guidance application for each different manufacturer listed for each appliance that was detected.

The media guidance application may receive user input that drags first Internet appliance 110 from first display region 150 to a second display region 130. In response to receiving the user input dragging the identifier of the given appliance from one region of the display to the other, the media guidance application may identify a channel space of the user equipment that includes a plurality of content source channels associated with the plurality of content sources and a plurality of virtual channels associated with Internet appliances. For example, the media guidance application may access a stored list of channels that includes a set of channels provided by the user's cable provider and a list of virtual channels (e.g., channels 100-104) that are unassigned or available to use for external appliances. The channels provided by the cable provider allow access to content that is broadcast/cablecast by the content provider to multiple users at scheduled times. The virtual channels are channels that provide access to local user devices/appliances. The media guidance application may search the virtual channels to identify a first virtual channel that is not currently assigned to an Internet appliance. For example, the media guidance application may search the virtual channels to determine whether a stored indication is present for a given virtual channel identifying an Internet appliance associated with that channel. The media guidance application may modify the channel space to associate the first virtual channel with the first Internet appliance by associating a virtual channel number, the determined identifier, type, and/or manufacturer with the first Internet appliance.

In some embodiments, a first video camera associated with a user is selected. The first video camera may be an IP appliance that transmits video content over the Internet. The first video camera may be selected via a drag-and-drop interface 100 shown in FIG. 1. Drag-and-drop interface 100 may be accessed by the user on the Internet by accessing a website associated with the media guidance application and/or locally using the locally implemented media guidance application on the user equipment. Any selections the user makes on the website may be transmitted to the local user device with instructions on which appliances to map to which channels and with instructions on accessing the activity feeds from each appliance.

For example, the media guidance application may present a user with a list of appliances or cameras to which the user has access. The list may include a first video camera 110 from a first vendor (e.g., RING) and a second camera 120 from a second vendor (e.g., NEST). The media guidance application may receive a user selection of first video camera 110 that drags the selected camera to second region 130 and drops the selected camera in second region 130. In response to the user dropping the camera in second region 130, the media guidance application may add the selected camera to a list of appliances that are integrated by the media guidance application. In some implementations, once a selected appliance is added to second region 130, the media guidance application may assign the selected appliance identifying information (e.g., icon, name, and type) and may associate the activity feed from the selected appliance with a channel number.

In some embodiments, the media guidance application may determine that unique identifiers (e.g., friendly names) for each camera can be managed by either the third-party application (e.g., a first vendor, such as RING), or by the user. For example, the media guidance application may receive input from the user to label a camera's unique identifier. As another example, the media guidance application may retrieve unique identifier names from the third-party application associated with the corresponding camera.

The media guidance application may identify a virtual channel number space in which the media guidance application may associate IP connected appliances. The virtual channel space may be provided by the content provider. The media guidance application may select a channel number from this space (e.g., based on the next available number or based on a vendor associated with a group of numbers) and associate each selected appliance with a corresponding number. Upon receiving a user selection of commit option 140, the media guidance application may modify the channel lineup in the guide to include the appliances listed in second region 130. For example, in response to a selection of option 140, the media guidance application may integrate on the user equipment the selected first video camera with content sources available from a content provider by adding the selected camera to the virtual channel space that is available from a content provider of content provider-provided channels. For example, the media guidance application may generate a channel lineup that includes a set of content provider channels on channels 1-5 (e.g., FOX, HBO, NBC, CBS, TBS) and appliance channels 100-105 (e.g., channel 100 for first video camera, channel 101 for a second video camera, etc.).

The list of appliances presented in interface 100 may be generated in several ways. For example, as part of a setup, the user may provide a login or credentials to the media guidance application for every appliance or manufacturer the user is interested in including. As referred to herein, the term "vendor" is used interchangeably with the term "manufacturer" but both should be understood to have the same meaning. In response, the media guidance application may log in to every server associated with the credentials and receive the activity associated with the corresponding appliance from the corresponding server. For example, the user may provide a RING login and a NEST login to the media guidance application. In response, the media guidance application may access the RING server and the NEST server to retrieve the activity feeds of the various appliances the user has purchased with these vendors. The media guidance application may be provided with authentication and handshaking information for passing security tokens between the media guidance application and each given appliance the user selects.

In some embodiments, the list of appliances may be automatically generated by the media guidance application in response to detecting various appliances on the local network of the user equipment in the home. For example, the media guidance application may transmit discovery messages to user devices in the home and each appliance may transmit back identifying information including an IP address and vendor information. The media guidance application may use the IP address and vendor information to retrieve an application programming interface (API) associated with each device (e.g., from local storage or a server) to communicate with the corresponding device. The media guidance application may receive the activity information directly from the appliance using the API of the appliance and/or may retrieve the activity information from a remote server associate with the corresponding appliance. In some embodiments, an aggregator of all the APIs of each device may provide access to the media guidance application to retrieve the APIs or communicate with the various appliances. For example, the media guidance application may communicate with the API aggregator with identifying information of each appliance the user selects. The API aggregator may then directly communicate with the servers associated with the appliances and/or directly with the appliances. This provides the media guidance application with a centralized server with which to communicate to receive activity information from each appliance associated with different vendors.

Figure 2:
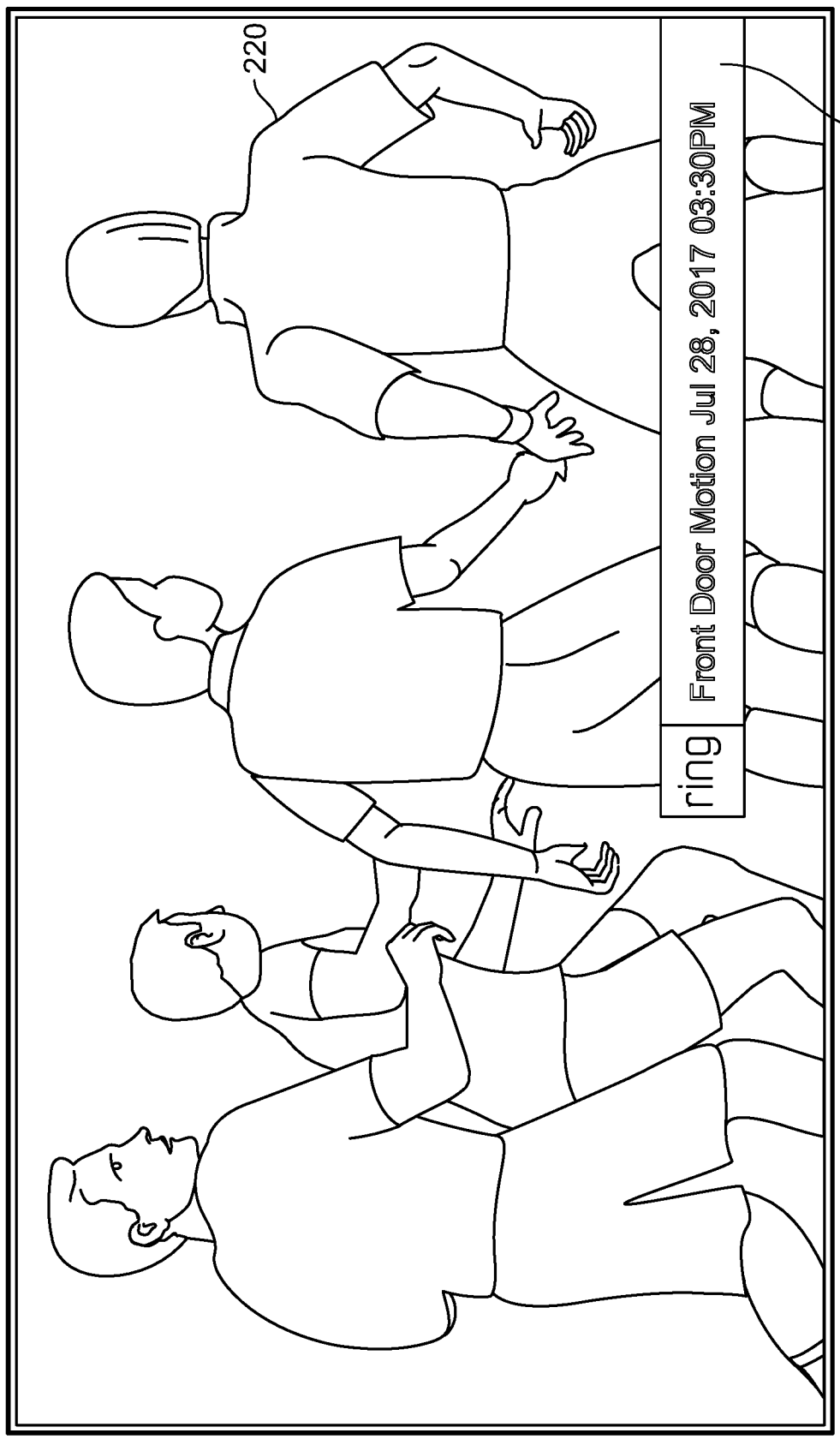
FIG. 2 shows an illustrative display screen for displaying activity detected by an Internet appliance in accordance with some embodiments of the disclosure.

After the selected appliance or camera is integrated with the content provider content sources (e.g., television channels), the media guidance application may receive notifications or activity information from each appliance. FIG. 2 shows an illustrative display screen 200 for displaying activity detected by an Internet appliance in accordance with some embodiments of the disclosure.

In some embodiments, the media guidance application may display video 220 from a first content source (e.g., NBC) of the content sources. For example, the media guidance application may present video 220 that is being broadcast to a plurality of users and is being received on a given channel (e.g., NBC). The media guidance application may receive data from a Internet appliance (e.g., a RING doorbell) indicating that the Internet appliance detected activity (e.g., motion). For example, the RING doorbell may transmit a notification to the RING server indicating that motion was detected. In such circumstances, the media guidance application may periodically poll the RING server to detect such activity that was reported to the RING server. Alternatively, the RING server may transmit notifications it receives from the RING doorbell to the media guidance application associated with the user account. Alternatively, the RING doorbell may transmit a notification to the media guidance application directly indicating that motion was detected (e.g., in accordance with the UPnP protocol). In response to detecting such activity, the media guidance application may present a notification 210 associated with the Internet appliance (e.g., the RING doorbell) that includes the received data simultaneously with video 220 from the first of the content sources. The data may include an image (not shown) of the detected activity and a description of the detected activity. For example, the media guidance application may present an overlay on top of the television show video 220 the user is viewing. The overlay may include information about the detected activity (e.g., motion was detected) and/or from which device/manufacturer (e.g., RING) server the activity notification was received. In some circumstances, the media guidance application may automatically begin recording video captured by the appliance in response to detecting the activity. To do so, the media guidance application may tune to or access the virtual channel associated with the appliance and begin recording the content received over that channel in the same manner as typically done for recording television shows broadcast by a content source.

For example, the media guidance application may monitor activity information on a server associated with each appliance and/or may receive activity information directly from the connected appliance. For example, a connected video camera may detect a person moving in a room. In response, the connected video camera may transmit a notification indicating the detection of the person. The notification may include an image or video clip associated with the detected activity. The media guidance application may receive the notification of activity and present the notification 210 together with video being received from another content source. For example, display 200 shows a video 220 being received from a given content source (e.g., a television channel from a content provider) or video being retrieved from an on-demand source such as a server or a local/remote storage device. In response to receiving the notification from a given appliance, the media guidance application may overlay notification 210 on top of the video that the user is viewing. The notification may include information identifying the appliance which detected the activity (e.g., RING vendor doorbell camera appliance).

Notification 210 may be interactive such that in response to the user selecting the notification (e.g., by pressing a SELECT button on a remote control), the media guidance application may present more information about the notification (e.g., the video clip or image, such as the last captured image, showing the person moving in the room captured by the doorbell camera or the live feed from the appliance). In some implementations, in response to the user selecting the notification, the media guidance application may change channels to the virtual channel associated with the appliance to display the live feed of activity received from the appliance. Once the live feed of the appliance is presented, the user may perform trick play operations. For example, the media guidance application may receive a rewind command from the user and in response the media guidance application may access a previous position within the video feed received from the appliance. The previous position may be accessed from a local storage device (e.g., the DVR), from the appliance itself, and/or from a server associated with the appliance.

In some embodiments, the media guidance application may transmit information to a selected appliance. For example, the user may select a voice option on the remote control or via an on-screen displayed option. The user may speak and the media guidance application may transmit the speech to the appliance the user is accessing. For example, the user may speak to someone at the door by speaking into the voice remote of the media guidance application. In some embodiments, the media guidance application may transmit the speech received from the user to all or a subset of appliances (e.g., in accordance with the UPnP protocol). For example, the media guidance application may identify a set of appliances associated with a characteristic (e.g., video cameras that are in a given location) and may send the voice command simultaneously for output by each of those video cameras. If a light appliance is determined to be in the selected appliances, the media guidance application may exclude sending the voice command to that appliance.

Figure 3:
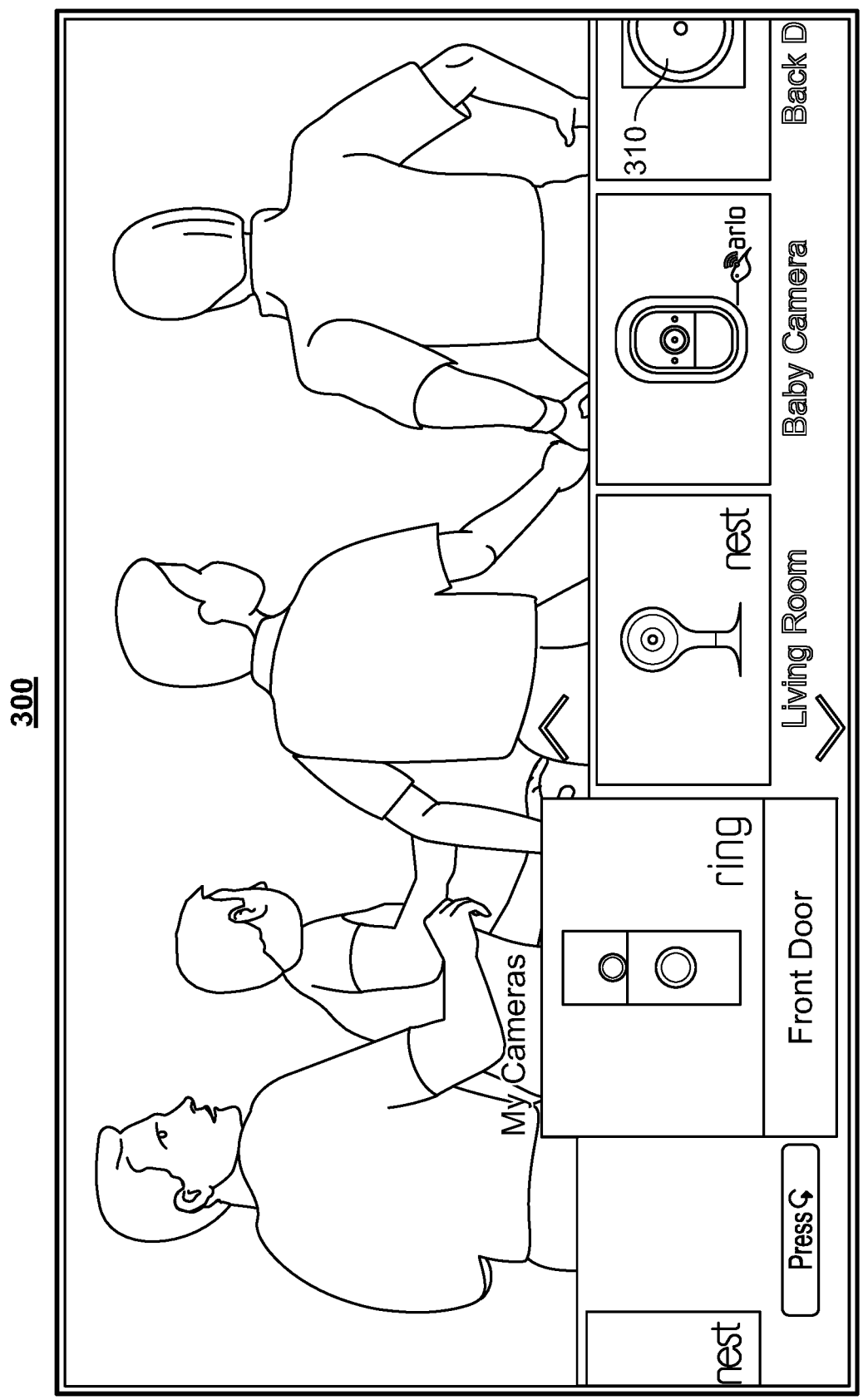
FIGS. 3-6 show illustrative display screens for browsing Internet appliances in accordance with some embodiments of the disclosure.

In some embodiments, the media guidance application may enable a user to navigate using the media guidance application through the integrated selected first video camera and content sources. FIGS. 3-6 show illustrative display screens for browsing Internet appliances in accordance with some embodiments of the disclosure. For example, the media guidance application may receive a user request to browse channels (e.g., by pressing the up arrow on a remote control) or view a guide. FIG. 3 shows a display 300 of video from a content source being presented. While a user is viewing the video from the content source (e.g., a television channel from a content provider), the user may press the up arrow to browse other content sources. In response, the media guidance application may present a browse bar 310 that includes a plurality of content sources from other channels including appliances on virtual channels. In particular, the media guidance application may present icons associated with each appliance in an order determined by the channel number associated with each appliance. As the user navigates the browse bar left/right, higher number/lower number content sources may be presented. For example, if the cursor is positioned over channel 100 associated with the Front Door appliance and the user presses the left arrow, the cursor may highlight channel 99, which is the previous channel, which may be a television channel providing live content from the content source (e.g., HBO).

In some implementations, the Internet appliance may be a user's Internet video camera. For example, the first Internet appliance may be a NEST camera the user installed in their living room. The NEST camera may be a camera that continuously captures video and uploads the captured video to a NEST server for storage for a predetermined period of time (e.g., 10 days or longer based on a subscription). Access to the NEST camera feed is available to the user by logging in to the NEST app or website and selecting the designated camera (e.g., living room camera). In such implementations, the media guidance application may present, together with video received from a first of the content sources, a browse region in which content information is presented for a second of the content sources associated with a current channel number. For example, the media guidance application may present video that is being broadcast to a plurality of users and is being received on a given channel (e.g., NBC). The media guidance application may present a navigable region (e.g., as an overlay) together with the video that is being broadcast that allows the user to view information for other channels (e.g., other content source channels or other virtual channels).

In some embodiments, the media guidance application may receive user input to navigate to a subsequent content source in a list of content sources, wherein the subsequent content source is associated with a channel number that is higher or lower in a sequence of channels. For example, the media guidance application may present information (e.g., scheduling information including title and broadcast times of media assets) for channel 99 (e.g., a content source channel, FOX). The media guidance application may receive a user input to navigate to a higher channel (e.g., channel 100). The media guidance application may determine that the next higher channel (e.g., channel 100) is a virtual channel that is associated with an Internet appliance (e.g., RING camera). The media guidance application, in response, may present in the browse region information associated with the Internet appliance and/or live video being received by the Internet appliance. For example, the media guidance application may present identifier, type, and/or manufacturer of the first Internet appliance and a live video feed being captured by the Internet appliance (e.g., in a window inside the browse region).

Figure 4:
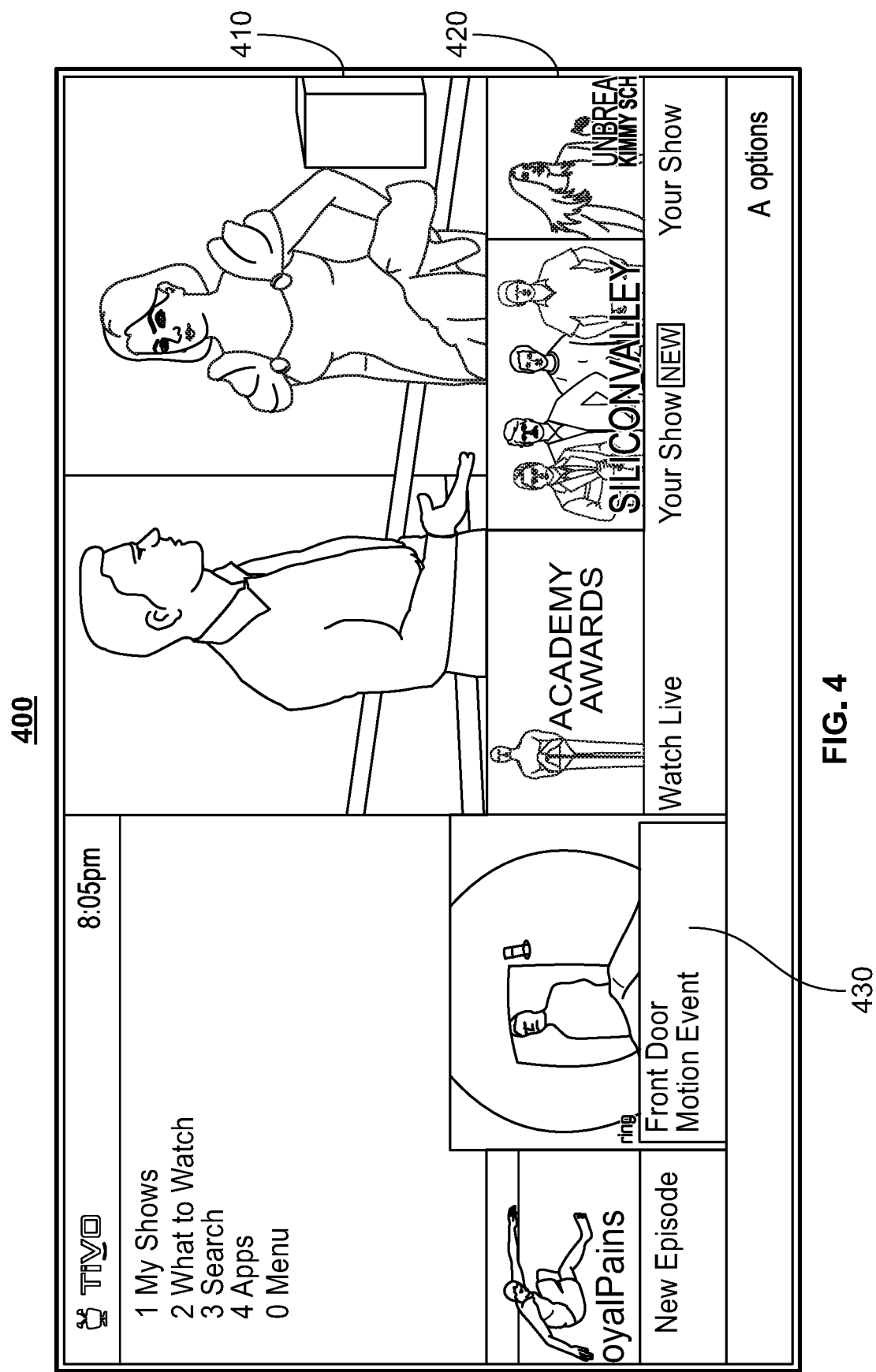

In some implementations, instead of or in addition to icons, the media guidance application may present activity information including content from each appliance in the browse bar. For example, FIG. 4 shows a display of the browse bar 420 with live video 430 being received from the appliance with additional activity information provided by the appliance. In particular, the live video 430 representation may be an image captured by the appliance and a description of the activity (e.g., motion event). Higher number channels (e.g., channel 200) are displayed to the right of the live video 430 and may correspond to content provided by the content source (e.g., television channels). In some implementations, the browse bar 420 may be presented in a display that includes the video from the content provider in a picture-in-guide window 410.

In some implementations, the media guidance application may receive a user request to perform a trick play operation on the live video presented in the browse region. In response to receiving the user request, the media guidance application retrieves stored video associated with the first Internet appliance that includes video captured by the first Internet appliance at a time in the past. For example, the media guidance application may determine the manufacturer associated with the Internet appliance (e.g., RING doorbell) displayed in the browse region. The media guidance application may access stored user credentials associated with the manufacturer (e.g., RING manufacturer credentials). The media guidance application may access the Internet appliance (directly or via the server associated with the first Internet appliance) using the stored user credentials. For example, the media guidance application may communicate with the RING server associated with the RING doorbell to provide the user's credentials and request a stored video feed of video captured by the RING doorbell. The stored video feed may be based on how far back the user rewinds the video shown in the browse region. In some implementations, the video feed from the first Internet appliance may be stored (periodically or continuously) on the user equipment on which the media guidance application is implemented (e.g., the DVR or set-top box). In such circumstances, in response to receiving the user request to perform the trick play operation on the video shown in the browse region, the media guidance application may retrieve and display in the browse region the stored video from the local storage device corresponding to the user requested position.

Figure 5:
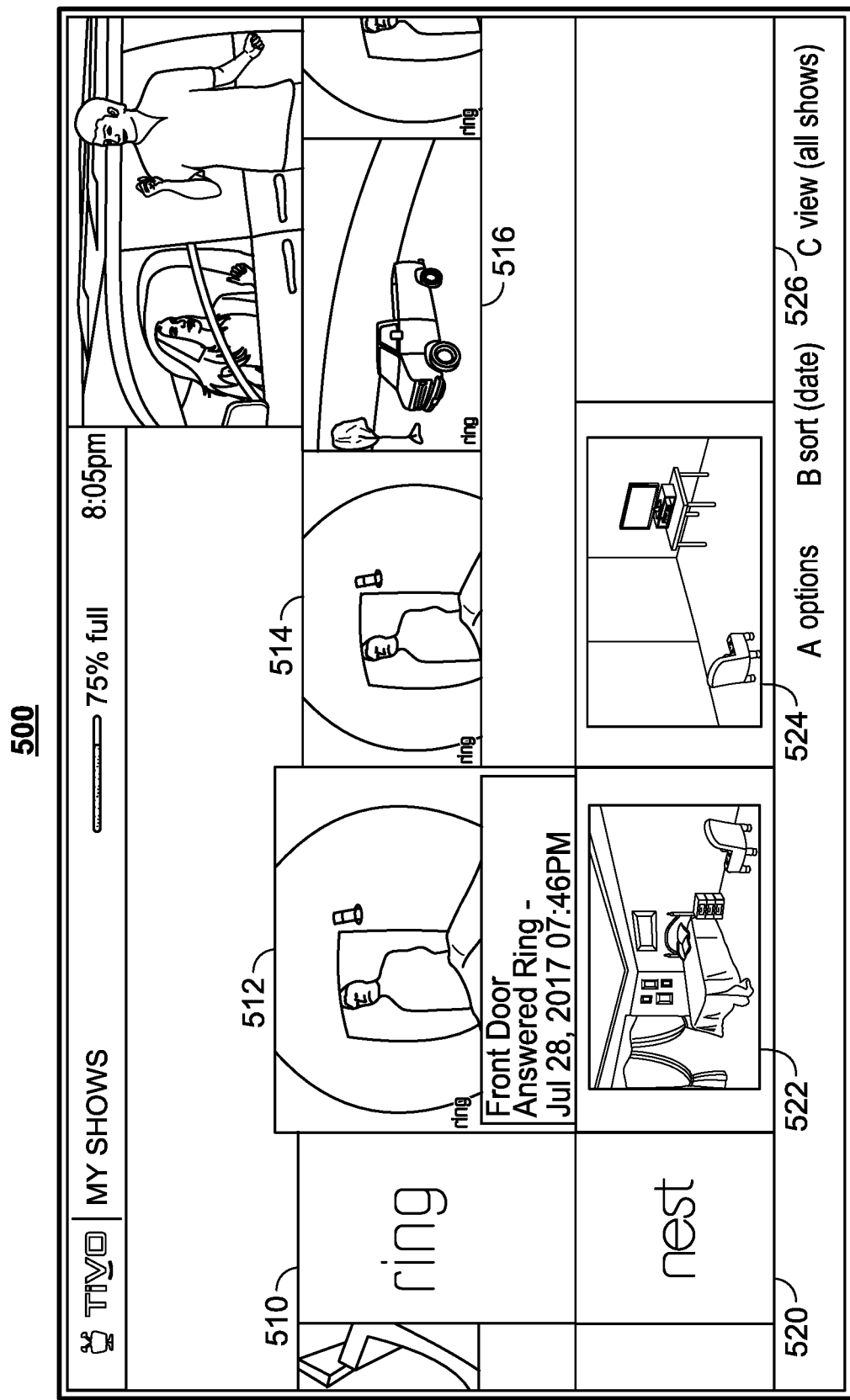

In some embodiments, the browse bar may be arranged according to the vendor associated with each appliance. FIG. 5 shows an illustrative display screen 500 for browsing Internet appliances in accordance with some embodiments of the disclosure. In some embodiments, the media guidance application may receive a user selection of an option to view a list of integrated Internet appliances. For example, the media guidance application may receive a user selection of the MENU button on a remote control or a selection of a SHOW APPLIANCES button on a remote control. In response to receiving the selection, the media guidance application may determine a manufacturer of each integrated Internet appliance in the list. For example, the media guidance application may access a list of previously detected appliances on the local network. The media guidance application may retrieve from the list the stored manufacturer of each appliance (e.g., RING and NEST). The media guidance application may generate a first set of integrated Internet appliances (e.g., NEST camera 1, NEST camera 2, NEST doorbell) associated with a first manufacturer (e.g., NEST) and a second set of integrated Internet appliances (e.g., RING camera 1, RING doorbell) associated with a second manufacturer (e.g., RING). For example, the media guidance application may identify all the detected appliances having the same first manufacturer (e.g., NEST) and generate a first set of Internet appliances associated with NEST (e.g., NEST camera 1, NEST camera 2, NEST doorbell, etc.). The media guidance application may identify all the detected appliances having the same second manufacturer (e.g., RING) and generate a first set of Internet appliances associated with RING (e.g., RING camera 1, RING doorbell, etc.).

The media guidance application may generate for display a plurality of rows, wherein a first of the plurality of rows 510 is associated with the first manufacturer (e.g., RING), and where a second of the plurality of rows 520 is associated with the second manufacturer (e.g., NEST). The media guidance application may generate for display, in the first row, a first plurality of cells 512, 514, and 516 each representing content/video captured and associated with each of the first set of integrated Internet appliances and generate for display, in the second row, a second plurality of cells 522, 524, and 526 each representing content/video captured and associated with each of the second set of integrated Internet appliances. For example, in a row for the NEST manufacturer, the media guidance application may present three cells 512, 514, and 516, one for each detected appliance associated with the NEST manufacturer (e.g., a cell for NEST camera 1, a cell for NEST camera 2, and a cell for NEST doorbell). For example, in a row for the RING manufacturer, the media guidance application may present two cells 522 and 524, one for each detected appliance associated with the RING manufacturer (e.g., a cell for RING camera 1, and a cell for RING doorbell). In each cell, the media guidance application may include any one of the following: live video captured by the corresponding appliance, information associated with the appliance, and/or an activity timeline of recent activity detected by the given appliance. The activity timeline may be the same as the activity timeline discussed below in connection with FIG. 7.

In particular, the media guidance application may group the video/image feeds of each of the cameras into a single row of icons or cells associated with the RING vendor and present those in vendor-specific browse bar 510. In response to the user pressing a down arrow, the media guidance application may present a single row of icons associated with a different vendor (e.g., Nest). The user may navigate to each icon in the row by pressing the right/left arrow keys. In response to the user pressing the SELECT button when a given icon or cell is highlighted, the media guidance application may present the activity received from the particular appliance in full screen (e.g., video is received from the particular appliance and presented in full screen). The video or activity may be received directly from the appliance and/or over the Internet from the vendor server associated with the selected appliance. For example, if a Nest camera is selected in the browse bar, the media guidance application may communicate with the Nest server to receive the video from the Nest server associated with the selected camera. In some implementations, the media guidance application may continuously receive the video from each camera directly and/or via the Internet from the corresponding server and present the video immediately when the user requests access via the browse bar or when the user changes channels to a channel associated with the given appliance (e.g., if the user selects channel 100 on the remote control). In some embodiments, cells 512, 514, 516, 522, 524 and 526 may only display images associated with the corresponding appliances or live video being captured, but one of the cells (e.g., cell 512) that is currently highlighted by the cursor may provide additional information (e.g., a description of the appliance or event being captured or a timeline associated with the appliance). When the user presses a down arrow while highlighting cell 522, the media guidance application may navigate the display to present additional manufacturers if more are available. When the user presses the right arrow when highlighting the last cell 516, the media guidance application may present information corresponding to additional appliances from the corresponding manufacturer.

In some embodiments, when the user has navigated to an icon corresponding to a camera, the video feed of the camera may be displayed in the icon. The media guidance application may determine that any trick play bar inputs (e.g., play, pause, stop, rewind, fast forward, etc.) may control the live video feed of the camera. For example, when the user navigates to an icon corresponding to a camera showing a live video feed, the media guidance application may pause playback of the live video feed in response to receiving a user input from a remote control corresponding to a "pause" input.

In some embodiments, when the icons are displayed on screen corresponding to each camera, the icon may display a picture, where the picture is an image corresponding to the product (e.g., an icon for a Nest camera may display the Nest logo).

In some embodiments, the user may share a live video feed with a second user. The user may input a command on the remote or the application to generate a link to send to the second user. The second user may access the link to access the live video on a user device (e.g., a smartphone, tablet, etc.). For example, the user may share the live video feed with a second user (e.g., someone the user is on the phone with) so that the second user can access the live video stream on the second user's computer (e.g., to remotely "housesit" for the user while the user is on vacation).

Figure 6:
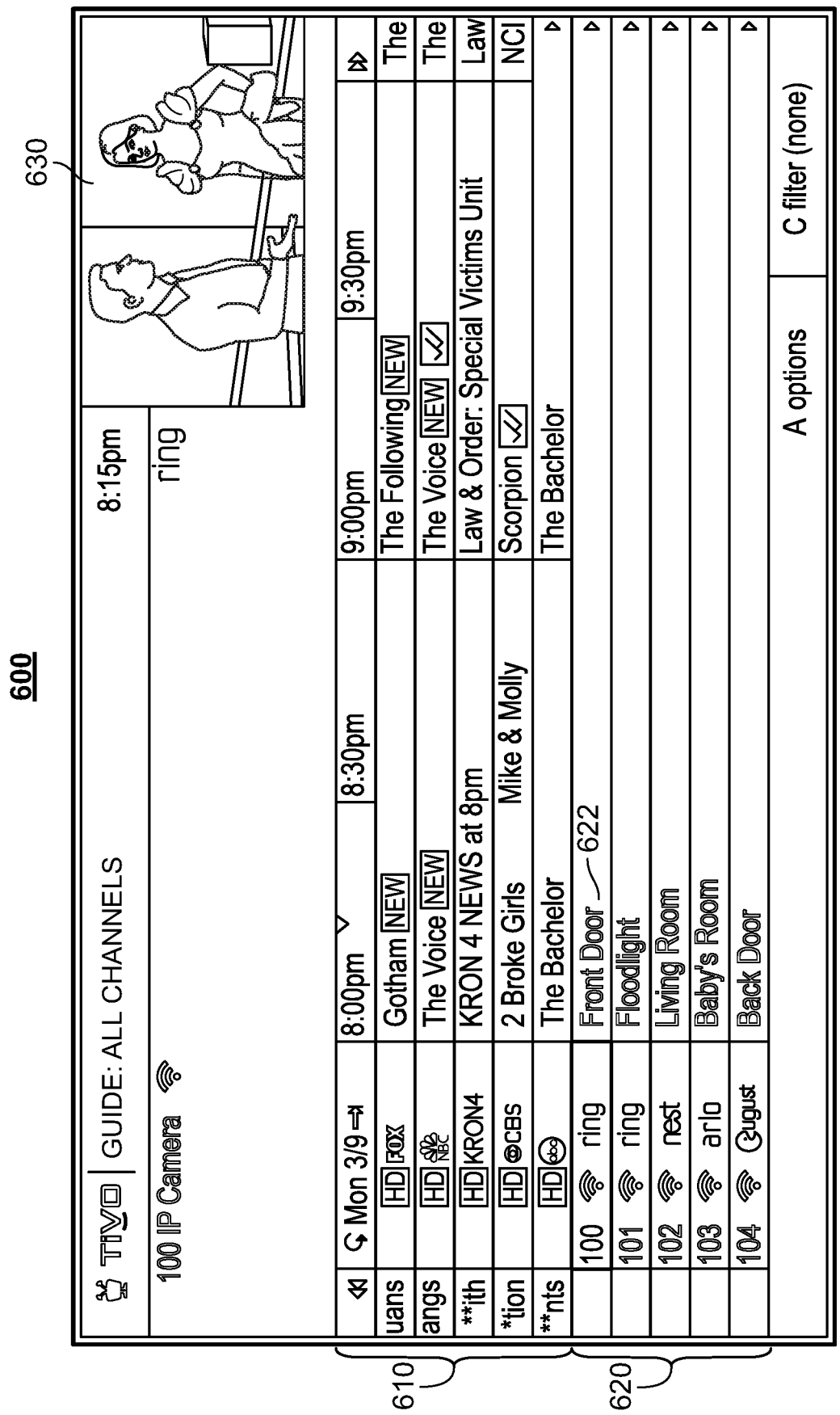

In some embodiments, the media guidance application may present a grid guide that includes content provider channels and virtual channels of the selected appliances. FIG. 6 shows an illustrative display screen 600 for browsing Internet appliances in accordance with some embodiments of the disclosure. The media guidance application may generate a simultaneous display of a first plurality of media asset listings 610, corresponding to a first plurality of media assets transmitted by each of the plurality of content sources (e.g., FOX, CBS, ABC) during a first time interval (e.g., 8 PM-10 PM) that includes the present time (e.g., 8:15 PM), and information received from the Internet appliances 620. For example, the user may select an option to view a set of listings for the current time (e.g., by pressing a GUIDE button on a remote control). In response, the media guidance application may present a grid guide that includes listings for a plurality of content sources (e.g., channels 1-99) and that includes information for the selected Internet appliances (e.g., RING doorbell, RING floodlight, NEST living room camera, the ARLO baby room camera, etc.). The listings may represent content transmitted by the plurality of sources in the present time (e.g., today at 8 PM-10 PM). The information for the selected Internet appliances may include current activity or lack thereof detected by the appliance, type of appliance, location information and/or video received from the Internet appliance.

The grid guide may be sorted by channel number such that if the virtual channels are higher in order numbers than the content provider channels they are displayed at the bottom. Along the content source axis, the channel numbers and names are provided for the content provider channels and the vendor provider is displayed for each appliance. Along the time axis, titles of programs being scheduled for transmission from the content sources are presented for content provider channels 610 and names of the appliances (e.g., video camera, doorbell, etc.) are provided for the virtual channels 620. The user can navigate the grid guide using a cursor, and when the user positions the cursor on a given appliance name listed for a given virtual channel, the media guidance application provides the user with several options.

In some embodiments, in response to receiving a user selection of a SELECT button on a remote control, the media guidance application may present in full screen or in the picture-in-guide window 630 the live feed received from the appliance. In some embodiments, the user may select an INFO button on a remote control while a cursor is positioned over a given appliance in display 600. In response, the media guidance application may provide the user with an option to start recording a feed from the appliance or subscribe to a series recording of the feed from the appliance. For example, in response to the user selecting the option to start recording, the media guidance application may store continuously on a local storage device or on a cloud storage device the activity information or video feed received from the selected appliance.

In some embodiments, the media guidance application may record a first media asset received from a first of the content sources. For example, the user may request that the media guidance application schedule for recording a television show being broadcast by a given content source at a particular time. When the particular time is reached, the media guidance application may automatically begin storing the television show received by the content source by accessing the channel associated with the content source. The media guidance application may receive a user selection of the information received from the Internet appliance. For example, the media guidance application may receive a user selection of the cell 622 displaying the name/identity associated with the Internet appliance (e.g., RING front door camera) in a grid guide. In response to receiving the user selection, the media guidance application may generate for display an option to schedule for recording video received, at a designated future time, from the first Internet appliance on a local storage device of the user equipment. For example, the media guidance application may present options for the user to specify conditions for recording video captured by the first Internet appliance on the DVR used to record the content from the content source. For example, the user may specify that video be recorded if any combination of the following is met: a person is detected in the video that the appliance is capturing, the appliance is in a given location, a time of day is reached, an activity is detected, a user is detected in the video feed of the camera, an event is detected, a person is within a threshold distance of another object in the video feed from the camera or is within a threshold distance from the camera.

In response to receiving a user selection of the option to record, the media guidance application may record video received from the first Internet appliance when the criteria are met (e.g., at the user-specified time of day). The user may select the option to subscribe to a series recording and may specify criteria for recording content from the given appliance. The criteria may include an event name, an activity type, and/or time/location. When the criteria are met, the media guidance application may locally record or remotely store the video or activity information from the selected appliance. For example, the user may specify that the criteria are movement or sound detected and as a result whenever the media guidance application receives a notification that the appliance detects movement or sound, the media guidance application may start recording the video feed on the particular virtual channel for a specified period of time (e.g., threshold time period or until the movement ends). For example, the user may specify that the criteria are an event and as a result whenever the media guidance application receives a notification that the appliance is capturing an event (e.g., when a friend provides a live feed of a concert), the media guidance application may start recording the video feed on the particular virtual channel for a specified period of time. For example, the user may specify that the criteria are a time/location and as a result whenever the media guidance application determines the appliance is at the location at the specified time, the media guidance application may start recording the video feed on the particular virtual channel for a specified period of time. For example, the user may specify that the criteria are a predicted event of interest and as a result whenever the media guidance application determines the appliance is capturing an event that is of interest to the user (e.g., a soccer game that a user's son is playing in), the media guidance application may start recording the video feed on the particular virtual channel for the length of the predicted event.

In response to receiving a user request to view a directory of recorded content, the media guidance application may generate for display a first media listing associated with the first media asset that has been recorded and a recording indicator associated with the Internet appliance (e.g., RING front door camera) indicating that the video from the Internet appliance was recorded. For example, the media guidance application may display a list of all recorded programs and include in that list an identifier of the video captured by the selected appliance. The identifier may include the manufacturer of the camera and/or any of the criteria that caused the media guidance application to record the video captured by the camera. For example, the media guidance application may specify a name of a person or type of motion detected by the camera as the identifier of the video. The user may select the identifier in the list of recorded content to play back the clip of the video captured by the appliance and recorded by the media guidance application.

Figure 7:
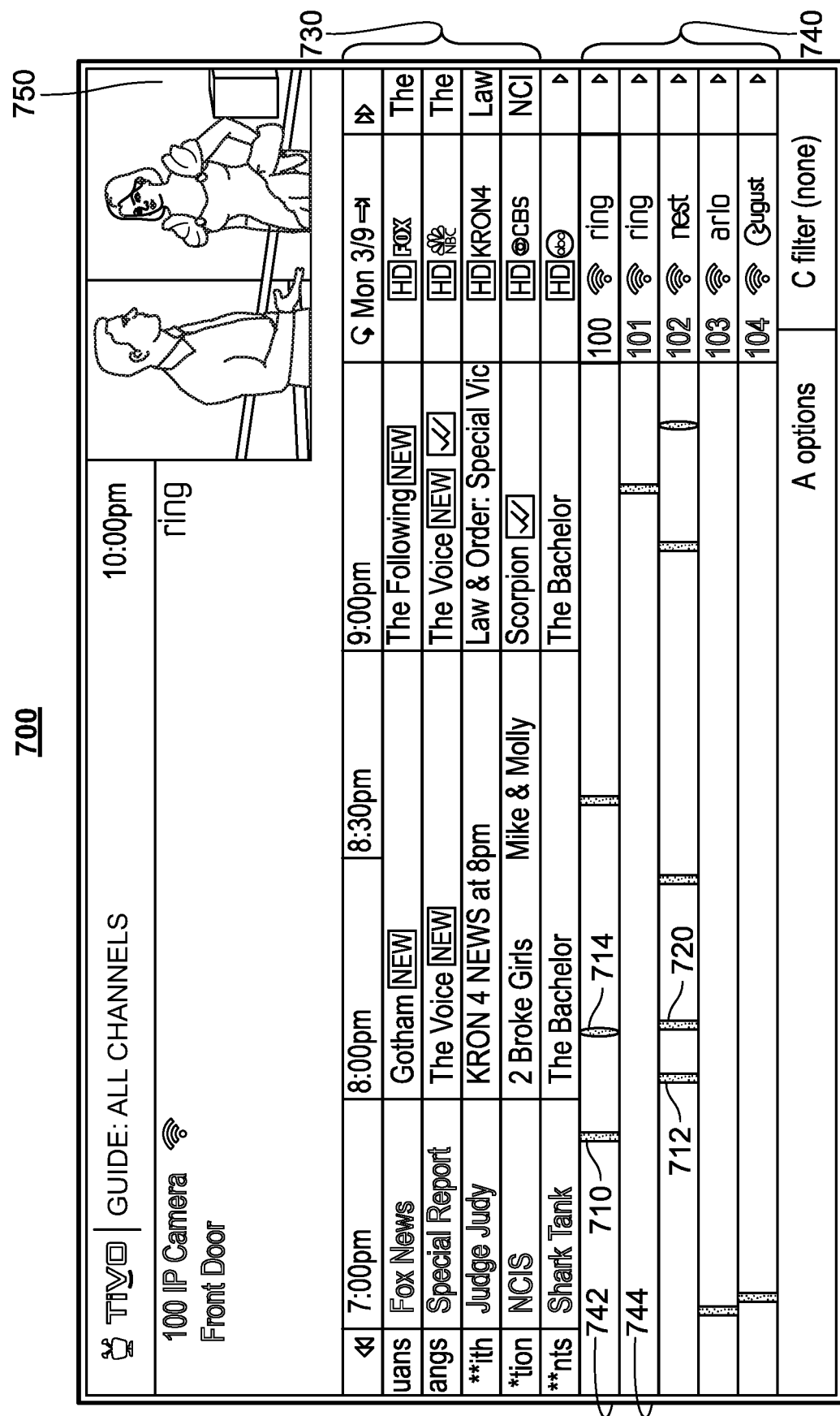
FIG. 7 shows an illustrative display screen for displaying an activity timeline for an Internet appliance in accordance with some embodiments of the disclosure.

In some embodiments, the media guidance application may allow the user to navigate to previous time periods to view previously transmitted media assets and previous activity detected by the selected appliances. FIG. 7 shows an illustrative display screen 700 for displaying an activity timeline for an Internet appliance in accordance with some embodiments of the disclosure. The media guidance application may receive a user request to navigate to a second time interval that includes a period of time that precedes the present time (e.g., 10 PM). For example, the user may navigate a cursor in screen 500 to the left to reach an earlier time period (e.g., today at 8-9:30 PM) that precedes the current time (e.g., today at 10 PM). The media guidance application may in response to receiving the user request to navigate to the previous time period (e.g., today at 8-9:30 PM), generate a simultaneous display of a second plurality of media asset listings 730, corresponding to a second plurality of media assets that were transmitted by each of the plurality of content sources during the second time interval, and a first timeline 742 that includes indicators 710 representing activity detected by the first Internet appliance (e.g., RING camera) during the second time interval (e.g., today at 8-9:30 PM). For example, the media guidance application may update the display to present listings of content transmitted earlier today between 8-9:30 PM by the plurality of sources. The media guidance application may display together with these past listings, timeline 742 representing activity detected by the selected Internet appliance. For example, the media guidance application may receive indications of motion/sounds detected by the RING video camera along with timepoints at which the motion/sounds were detected (e.g., 7:45 PM, 8:32 PM). The media guidance application may identify which of the motion/sounds were detected at the selected previous time of 8-9:30 PM. The media guidance application may present a timeline with indicators at each point between 8-9:30 PM at which the motion/sounds were detected as the information in the grid row for the selected Internet appliance. The indicators may differ depending on the type of activity they represent (e.g., red indicators may identify motion and blue indicators may identify sounds).

In some embodiments, in order to generate the timeline of activity detected by the first Internet appliance, the media guidance application may search a database associated with the first Internet appliance to identify activity detected by the first Internet appliance during the second time interval. For example, the media guidance application may transmit a request to a server associated with the selected Internet appliance. The request may identify the second time interval and request activity information (including any video clips) that was detected during the second time interval. For example, the media guidance application may contact the RING server to obtain information about the RING video camera that was selected as the first Internet appliance. The media guidance application may provide login credentials of the user associated with the RING video camera. The RING server may search its database for the requested content and return to the media guidance application the requested activity information. The media guidance application may assemble this information into a timeline including the appropriate indicators of activity. In some implementations, the media guidance application may contact the RING video camera directly over the local network to obtain the information about the activity detected during the second time interval. The media guidance application may assemble this information received directly from the RING video camera into first timeline 742 including the appropriate indicators of activity.

The media guidance application may search a database associated with a second Internet appliance (e.g., NEST camera) to identify activity detected by the second Internet appliance during the second time interval. The second Internet appliance is associated with a different manufacturer than the first Internet appliance. For example, the second appliance manufacturer may be NEST and the first appliance manufacturer may be RING. The second Internet appliance may be a different type than the first Internet appliance. For example, the second appliance may be a camera while the first appliance may be a doorbell. The user may select a NEST camera from a list of detected appliances. In response, the media guidance application may access a NEST server and/or the NEST camera itself to retrieve activity detected by that appliance. For each identified activity, the media guidance application may retrieve, from the database associated with the second Internet appliance, a timepoint representing when the identified activity was detected by the second Internet appliance. For example, each detected activity may be assigned a range of time during which the activity was detected. In particular, the NEST camera may detect a person in view of the camera at 8:05 PM, 8:15 PM, 8:29 PM, 9:15 PM and 9:25 PM. As such, the NEST camera may associate with this activity the timepoints 8:05 PM, 8:15 PM, 8:29 PM, 9:15 PM and 9:25 PM.

The media guidance application may generate a second timeline 744 having a length corresponding to the second time interval (7 PM-9:30 PM). For example, if the user navigates back to the previous time period 7 PM-9:30 PM, the media guidance application may generates second timeline 744 having a range of 2.5 hours representing activity that was detected by the second appliance between 7 PM-9:30 PM. The media guidance application may add indicators 720 to the second timeline at positions 8:05 PM, 8:15 PM, 8:29 PM, 9:15 PM and 9:25 PM corresponding to the retrieved timepoints representing when the respective activity was detected by the second Internet appliance. For example, the media guidance application may add a first indicator of a first type (e.g., a blue line) for motion activity that was detected at a particular point (e.g., at 8:05 PM) and may add a second indicator of a second type (e.g., a red circle) for audio activity that was detected at a particular point (e.g., at 9:25 PM). The media guidance application may generate a simultaneous display of the second plurality of media asset listings 730, first timeline 742 that includes the indicators 710 representing activity detected by the first Internet appliance (e.g., RING doorbell) during the second time interval, and second timeline 744 that includes indicators 720 representing activity detected by second Internet appliance (e.g., NEST camera) during the second time interval (7-9:30 PM).

FIG. 7 shows a display 700 of previous time periods to which the user navigated. For example, the current time may be 10 PM and the media guidance application may have received a user input to navigate to previous time periods (e.g., the time period from 8 PM-9:30 PM). Display 700 may include a list of titles that represent programs each of the content provider sources (e.g., FOX, CBS, ABC) previously provided at the scheduled transmission time (e.g., "Gotham" at 8 PM and "Scorpion" at 9 PM). The user may navigate a cursor to any of these programs and the user may select the title to access the corresponding previously transmitted program. The programs may be accessed from an on-demand server or local storage if they were recorded at the previously scheduled time period. In some embodiments, for each of the Internet appliances (e.g., RING camera or Nest camera), the media guidance application may present activity markers 710 and 720 at the corresponding timepoints at which activity was detected. For example, if the RING camera detected motion at 7:49 PM, the RING camera may provide this indication of activity including the time, length of activity, and type of activity (e.g., motion) to the media guidance application. The media guidance application may present marker 710 at the time position 7:49 PM to inform the user about the previously detected activity in the row corresponding to the RING camera appliance. For example, if the Nest camera detected sound at 8:15 PM, the Nest camera may provide this indication of activity including the time, length of activity, and type of activity (e.g., sound) to the media guidance application. The media guidance application may present marker 720 at the time position 8:15 PM to inform the user about the previously detected activity in the row corresponding to the Nest camera appliance. In some embodiments, marker 710 and 720 may be visually distinguished based on the type of activity the marker represents. In particular, marker 710 may be in the color blue to represent motion detected and marker 720 may be in the color green to represent sound detected.

In some embodiments, the media guidance application may assign channels to user-chosen subscriptions. For example, in response to the user selecting to subscribe to a content source (e.g., such as Facebook Live, Amazon, Periscope, etc.), the media guidance application may assign a channel to the subscription. In some embodiments, the channels may be preset on the media guidance application and user equipment. The media guidance application may receive a notification, generated by detecting upcoming content on the channel associated with the subscription, for an event on the channel (e.g., the user receives an overlay notification alerting the user that an MLB baseball game will be streaming on the "Facebook" channel at 7:00 pm). The media guidance application may subscribe to subsets of content available from a content source (e.g., individual users on Facebook, individual sports, etc.). The media guidance application may retrieve content from the content source based on user-specified areas of interest (e.g., only record "Facebook Live" streams from specific individual users about sports) to stream on the channel associated with the subscription. The media guidance application may record the content streams in local or remote storage. The media guidance application may allow the user to access the recorded content streams to watch previously recorded live content.

In some embodiments, the user may navigate a cursor to the markers 710 and 720 to view content associated with the previously detected activity. For example, the user may highlight marker 710 and press a SELECT button on a remote control. In response, the media guidance application may retrieve previously recorded content of the activity represented by marker 710. In particular, the media guidance application may retrieve a video clip stored on the RING server during the particular previous time period of 7:40-8 PM. Alternatively, the media guidance application may retrieve a video clip stored on a local storage device in the user equipment during the particular previous time period of 7:40-8 PM. The video clip may have been automatically recorded by the media guidance application in response to receiving detection of activity from the corresponding appliance by accessing the video feed from the camera directly or from the server associated with the camera. In some embodiments, the clips may be presented in full screen or in a picture-in-guide window 750 while continuing to show the listings of content and activity of the previous time period. In some embodiments, the activity timeline of each appliance may be retrieved from the server associated with each appliance based on the API associated with the appliance. For example, the media guidance application may identify the previous time period to which the user navigated in the grid to the servers associated with each appliance and request the timeline of activity that was detected by each appliance during the time period for presentation in the grid.

In some embodiments, the media guidance application may receive a user request to play highlights of the appliances from the previous time periods. In some embodiments, the media guidance application may navigate a cursor to a first indicator that represents a first activity detected by the first Internet appliance. For example, the user may press arrows on a remote control to navigate a cursor from a program listing representing previously transmitted content (e.g., 2 "Broke Girls") by the content source (e.g., CBS) down to an activity indicator 710 (e.g., motion activity detected by a RING doorbell camera at 7:49 PM). The cursor may visually distinguish the selected activity indicator 710. The media guidance application may receive a user request to sequentially present content associated with the activities detected by the first and second Internet appliances starting from a point in time associated with the first indicator. For example, the user may select a PLAY button on a remote control while the cursor is positioned over first indicator 710 to instruct the media guidance application to generate a playlist of activities detected starting from the timepoint of the first indicator 710 (e.g., 7:49 PM) to the current time (e.g., 10 PM) or to the end of the second time period that is displayed (e.g., 9:30 PM).

The media guidance application may generate for display content or clips representing the first activity detected by the first Internet appliance (e.g., RING doorbell). For example, the media guidance application may retrieve a locally stored clip associated with the selected activity or may access a RING server and request a clip associated with the selected activity detected by the RING doorbell at 7:49 PM. The media guidance application may determine that a second indicator 712 that represents a second activity detected by the second Internet appliance (e.g., NEST camera) is positioned between the first indicator 710 and a third indicator 714 that represents a third activity detected by the first Internet appliance. For example, the media guidance application may search all of the selected detected appliances across all of the assigned virtual channels 740 and the activities represented in the simultaneous display for any activity that was detected and represented by a timeline following 7:49 PM. The media guidance application may determine that at 8:05 PM the NEST camera detected an activity that is represented in timeline 744 in the simultaneous display. Accordingly, following presentation of the clip associated with the RING doorbell of activity that was detected at 7:49 PM, the media guidance application may access and present a clip associated with the activity detected by the NEST camera at 8:05 PM. In this manner, the media guidance application may generate a playlist of clips representing activities in a sequential and chronological manner across all of the detected and selected Internet appliances. In some embodiments, the clips may be sequentially presented in window 750 or in full screen.

In response, the media guidance application may access a video clip from each of the appliances during each of the previous time periods where activity was detected and may play each video clip in accordance with the time period during which the activity was detected. In particular, the media guidance application may first retrieve a clip from the RING camera associated with the time period 7:40-7:49; after that clip ends, the media guidance application may retrieve a second clip automatically from the Nest camera associated with the time period 8-8:15 PM. After that clip ends, the media guidance application may identify an activity that was detected sequentially after 8:15 PM (e.g., a clip from another RING camera of activity detected between 8:45-9 PM). The media guidance application may automatically play the next video clip from the third camera (e.g., the another RING camera). The media guidance application may continue playing back each clip from each appliance in accordance with when the activity was detected until the last previously detected activity is reached.

In some embodiments, the media guidance application may present content or activity (e.g., a live video feed) of each of a selected set of cameras in a split screen manner. For example, a video feed from a RING camera may be presented in a left half of a display screen (e.g., a left window) and video feed from a Nest camera may be presented in a right half of the display screen (e.g., a right window). Audio may be output from each camera based on which window the user highlights. For example, if the user navigates a cursor to the right window, the audio from the Nest camera may be output.

In some embodiments, the media guidance application may present activity from one appliance in a larger area of a screen than activity from another appliance based on the activity being detected by the appliance and/or based on the type of appliance. For example, in the split screen embodiment, the media guidance application may present the RING camera in the left window which may be larger in size than the Nest camera displayed in the right window. Particularly, the media guidance application may be configured to always present content from the RING camera in a larger size than content from the Nest camera. In some implementations, the media guidance application may be configured to detect where each appliance is located and select the window size based on the location of the appliance. For example, if the appliance is located in the front door and capturing content from the front door, the media guidance application may output video from that camera in a larger window than a camera capturing content in a particular bedroom. In some implementations, the media guidance application may be configured to detect the activity being captured by each appliance and select the window size based on the activity detected by the appliance. For example, if the appliance is capturing motion of an unknown person (e.g., a stranger at the front door), the media guidance application may output video from that camera in a larger window than a camera capturing motion of a baby in a particular bedroom. In some embodiments, the video or content from a particular appliance may be presented in a picture-in-picture window with live content being received from a content source of the content provider (e.g., a television channel). The size of the picture-in-picture window may be selected in a similar manner to those above (e.g., based on activity type, camera type, and/or camera location).

In some embodiments, the media guidance application may receive verbal input from the user requesting that activity from a particular camera be presented. For example, the media guidance application may receive verbal input "Show me the front door" and the media guidance application may search descriptions of each appliance to identify the word "front door". In response, the media guidance application may retrieve the activity or video content being captured by the RING front door camera and present the video to the user.

In some embodiments, the media guidance application may receive a user selection of a person shown in the content or activity received from a given appliance. For example, the video footage from the RING front door camera may capture a stranger. The user may select the stranger in the footage shown to the user and in response the media guidance application may store a facial profile of the selected stranger. The media guidance application may monitor video footage of the stranger across all of the selected appliances (e.g., the RING door camera, the Nest bedroom camera, and the RING living room camera). In response to detecting the facial profile in any of the cameras, the media guidance application may record a segment in which the stranger appears. The media guidance application may present to the user a sequence of clips featuring the selected stranger in order of the times associated with the clips at which the activity of the stranger was detected.

In some embodiments, in response to detecting a person having the selected facial profile or in response to detecting a person that does not match any previously set friendly facial profiles, the media guidance application may start recording footage received from the appliance that detected the person. The media guidance application may automatically present the footage in a PIP window together with other content from another content source (e.g., a television channel). In some embodiments, the media guidance application may detect that the user equipment is in stand-by mode and not presenting any content. In response to detecting the person, the media guidance application may automatically turn on the user equipment by taking it out of stand-by mode and present the footage received from the appliance that detected the person. In some implementations, the media guidance application may only take the user equipment out of stand-by mode if the activity or person is detected at a particular time of day (e.g., at night). For example, if the person is detected during the daytime hours, the media guidance application may simply record the footage of the person for later presentation to the user and not turn on the user equipment. For example, if the person is detected during the nighttime hours, the media guidance application may immediately present the live footage of the person being captured by the appliance for immediate presentation to the user and by turning on the user equipment. In some embodiments, the media guidance application may consider the location and distance of the detected person to other objects in determining whether to present the footage live or to record the footage. For example, if the person is detected 100 yards away from the home, the media guidance application may record the footage being captured, but if the person is within 10 feet of the home or a user's personal property (e.g., a car of the user), the media guidance application may immediately present the live footage. In some embodiments, the media guidance application may record the footage of activity that was detected instead of or in addition to presenting the footage to the user if the user is currently viewing other content from another content source or another appliance, to avoid disrupting the user.

In some embodiments, the media guidance application may detect an object present in the live footage via object detection. The media guidance application may compare the object to a database of known objects to determine the type of object present in the live footage. In response to determining the type of object, the media guidance application may determine a level of threat based on the type of detected object. For example, the media guidance application may determine a level of threat (e.g., low, medium, high) based on characteristics of the detected object. The media guidance application may determine that a detected object, such as a gun, has a high level of threat because its characteristics (e.g., deadly, unsafe, etc.) indicate that it's dangerous. The media guidance application may determine that a detected object, such as a delivered package, has a low level of threat because its characteristics (e.g., Amazon package, matches tracking information of a package the user ordered, etc.) indicate that it's safe and expected by the user. The media guidance application may determine and perform an action in response to the threat based on the determined level of threat. For example, the media guidance application may determine to perform an action by retrieving, from a database, an action corresponding to a level of threat. For example, for high levels of threat (e.g., the detected object is a gun), the media guidance application may determine, from the database, that the appropriate action in response is to alert the authorities. As another example, for low levels of threat (e.g., the detected object is a delivered package), the media guidance application may determine, from the database, that the appropriate action is to alert the user with a notification (e.g., may send the user a screenshot of the delivered package from the live feed).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
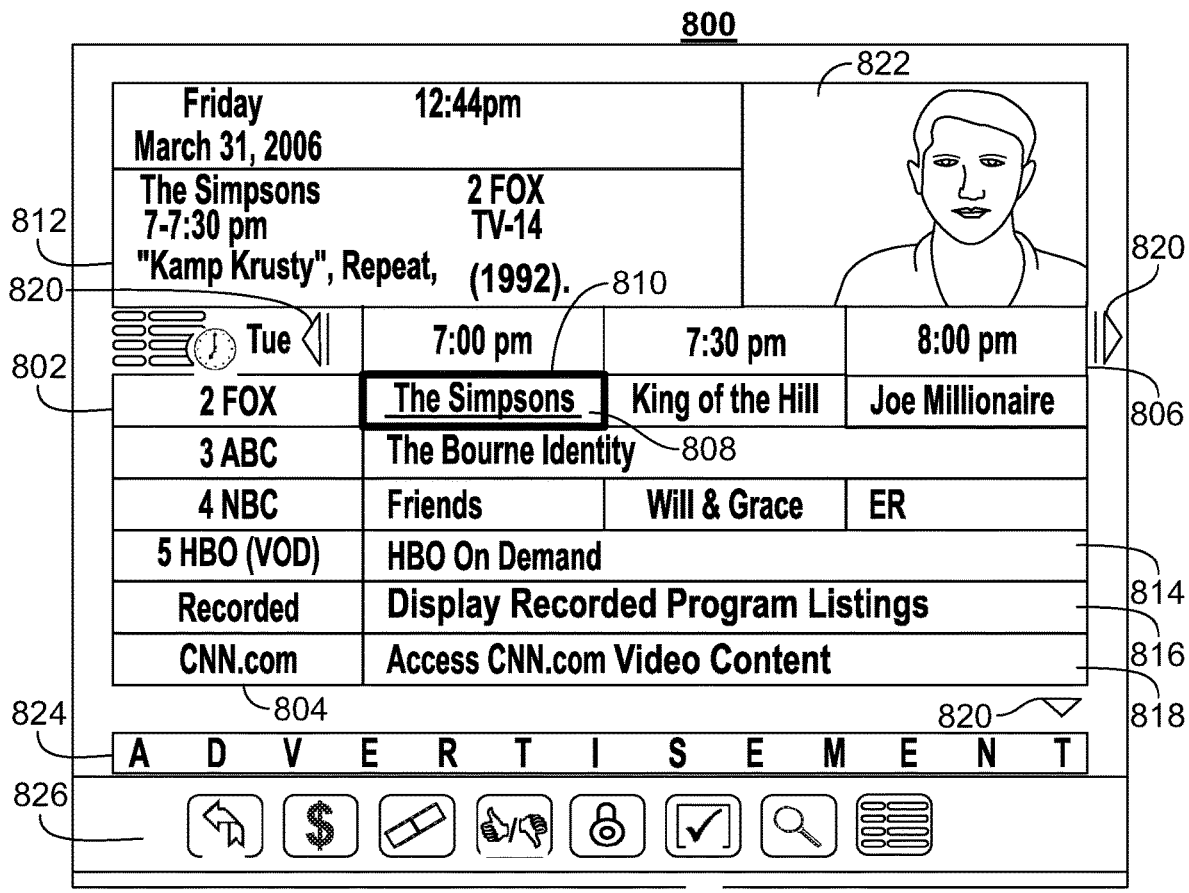
FIGS. 8 and 9 show illustrative examples of display screens generated by a media guidance application in accordance with some embodiments of the disclosure.
Figure 9:
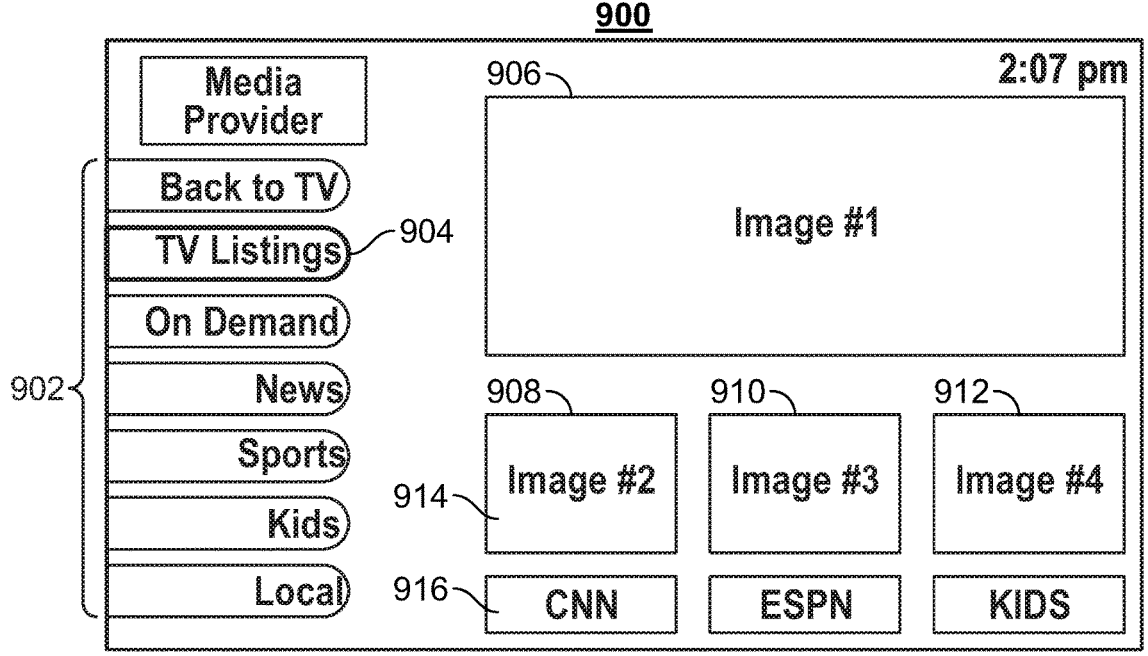

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. The program listings in display 800 represent content available to the user from the subscribed content source bundle (e.g., first content source bundle 110). After the content source bundle is modified by the media guidance application, a different set of program listings may be provided representing programs available from the revised list of content sources in the modified bundle. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
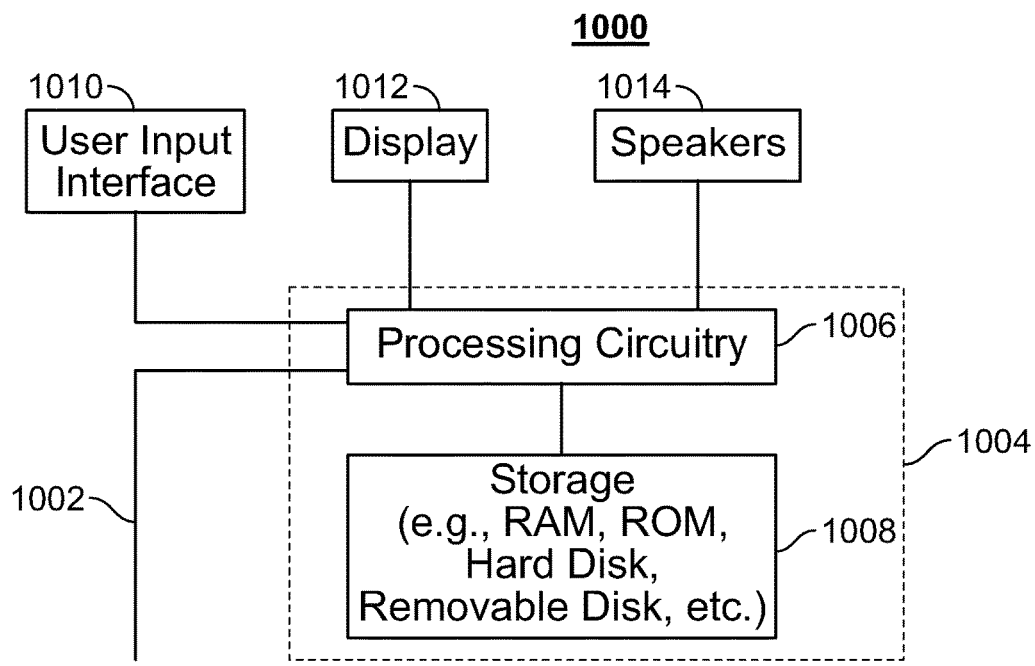
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
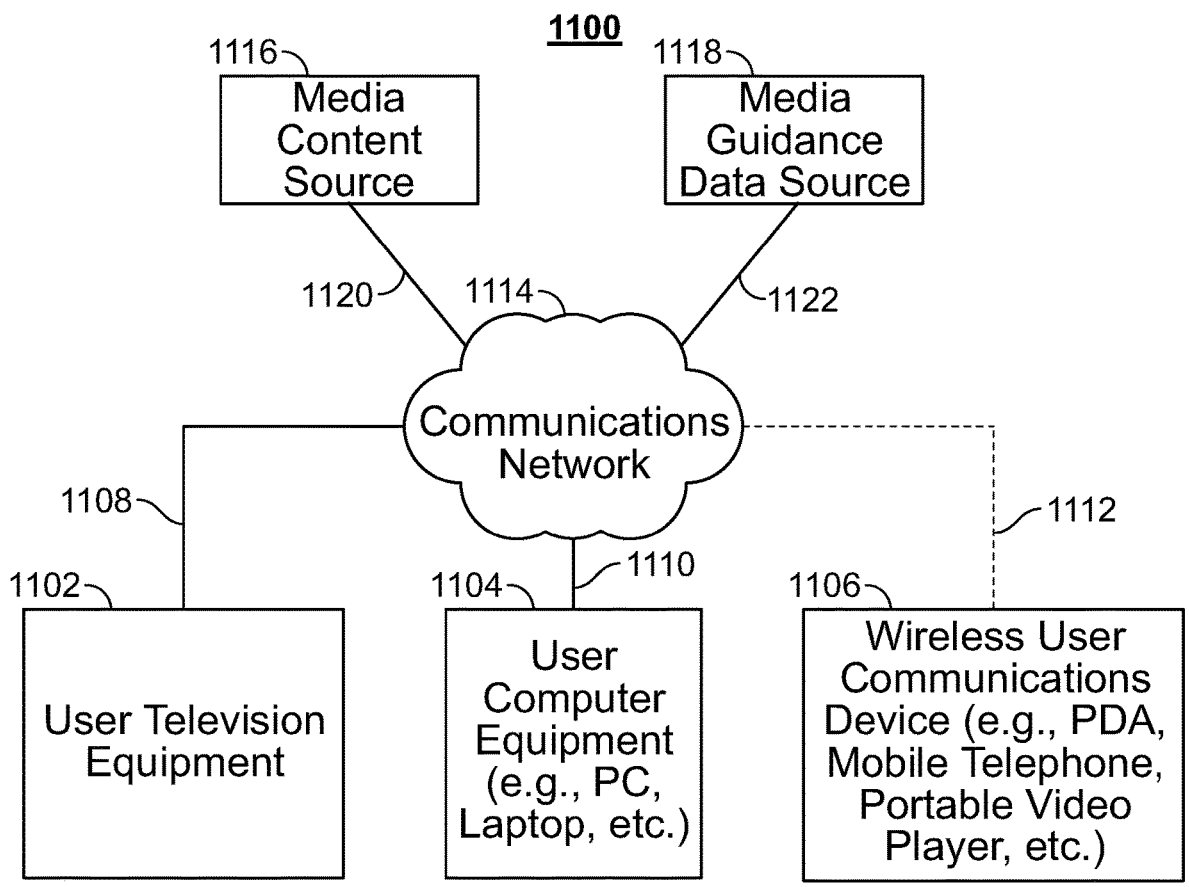
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

System 1100 may also include an advertisement source 1124 coupled to communications network 1114 via a communications path 1126. Path 1126 may include any of the communication paths described above in connection with paths 1108, 1110, and 1112. Advertisement source 1124 may include advertisement logic to determine which advertisements to transmit to specific users and under which circumstances. For example, a cable operator may have the right to insert advertisements during specific time slots on specific channels. Thus, advertisement source 1124 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 1124 may be configured to maintain user information including advertisement-suitability scores associated with user in order to provide targeted advertising. Additionally or alternatively, a server associated with advertisement source 1124 may be configured to store raw information that may be used to derive advertisement-suitability scores. In some embodiments, advertisement source 1124 may transmit a request to another device for the raw information and calculate the advertisement-suitability scores. Advertisement source 1124 may update advertisement-suitability scores for specific users (e.g., first subset, second subset, or third subset of users) and transmit an advertisement of the target product to appropriate users.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Content source 1116 may be a source that transmits content to a plurality of users according to a given schedule. Content source 1116 may make available the same content to any user who is a subscriber to the content source. Namely, each user who is a subscriber may be provided with a different user account but may access the same content from content source 1116.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 12 is a flowchart of detailed illustrative process 1200 for displaying an Internet appliance timeline with content source media assets in accordance with some embodiments of the disclosure. It should be noted that process 1200 or any step thereof could be performed on, or provided by, any of the devices shown in FIGS. 10-11. For example, process 1200 may be executed by control circuitry 1004 (FIG. 10) as instructed by a media guidance application implemented on a user device (e.g., user equipment devices 1102, 1104, and/or 1106 (FIG. 11)) in order to manage user subscriptions to content sources. In addition, one or more steps of process 1200 may be incorporated into or combined with one or more steps of any other process or embodiment described herein.

At step 1210, a first Internet appliance, external to user equipment, is integrated with a plurality of content sources accessible to the user equipment. For example, control circuitry 1004 may receive user input selecting a given Internet appliance (e.g., NEST camera) from first display region 150. In response to receiving a user selection of the NEST camera, control circuitry 1004 may assign an available virtual channel (e.g., virtual channel 102) to the NEST camera in the channel space that includes content source channels (e.g., television channels) and virtual channels (FIG. 1).

At step 1220, a simultaneous display of a first plurality of media asset listings, corresponding to a first plurality of media assets transmitted by each of the plurality of content sources during a first time interval that includes the present time, and information received from the first Internet appliance is generated. For example, control circuitry 1004 may generate for display screen 600 which includes media asset listings 610 (e.g., "Gotham" transmitted by FOX, "The Voice" transmitted by NBC, "2 Broke Girls" transmitted by CBS, etc.) and virtual channels 620 representing information received from the appliances (e.g., NEST camera) with identifying information associated with each appliance (FIG. 6).

At step 1230, a user request to navigate to a second time interval that includes a period of time that precedes the present time is received. For example, control circuitry 1004 may receive a user input navigating a cursor to the left a number of times to shift the time interval that is being displayed (e.g., from the current time to the past or previous time).

At step 1240, in response to receiving the user request, a simultaneous display of a second plurality of media asset listings, corresponding to a second plurality of media assets that were transmitted by each of the plurality of content sources during the second time interval, and a first timeline that includes indicators representing activity detected by the first Internet appliance during the second time interval is generated. For example, control circuitry 1004 may generate for display screen 700 which includes media asset listings 730 (e.g., "Gotham" transmitted by FOX, "The Voice" transmitted by NBC, "2 Broke Girls" transmitted by CBS, etc.) that were transmitted in a previous time interval (e.g., 8-9:30 PM where the current time is 10 PM) and virtual channels 740 representing timeline 742 indicating activity detected by the appliances (e.g., NEST camera) (FIG. 7).

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 12.

Figure 13:
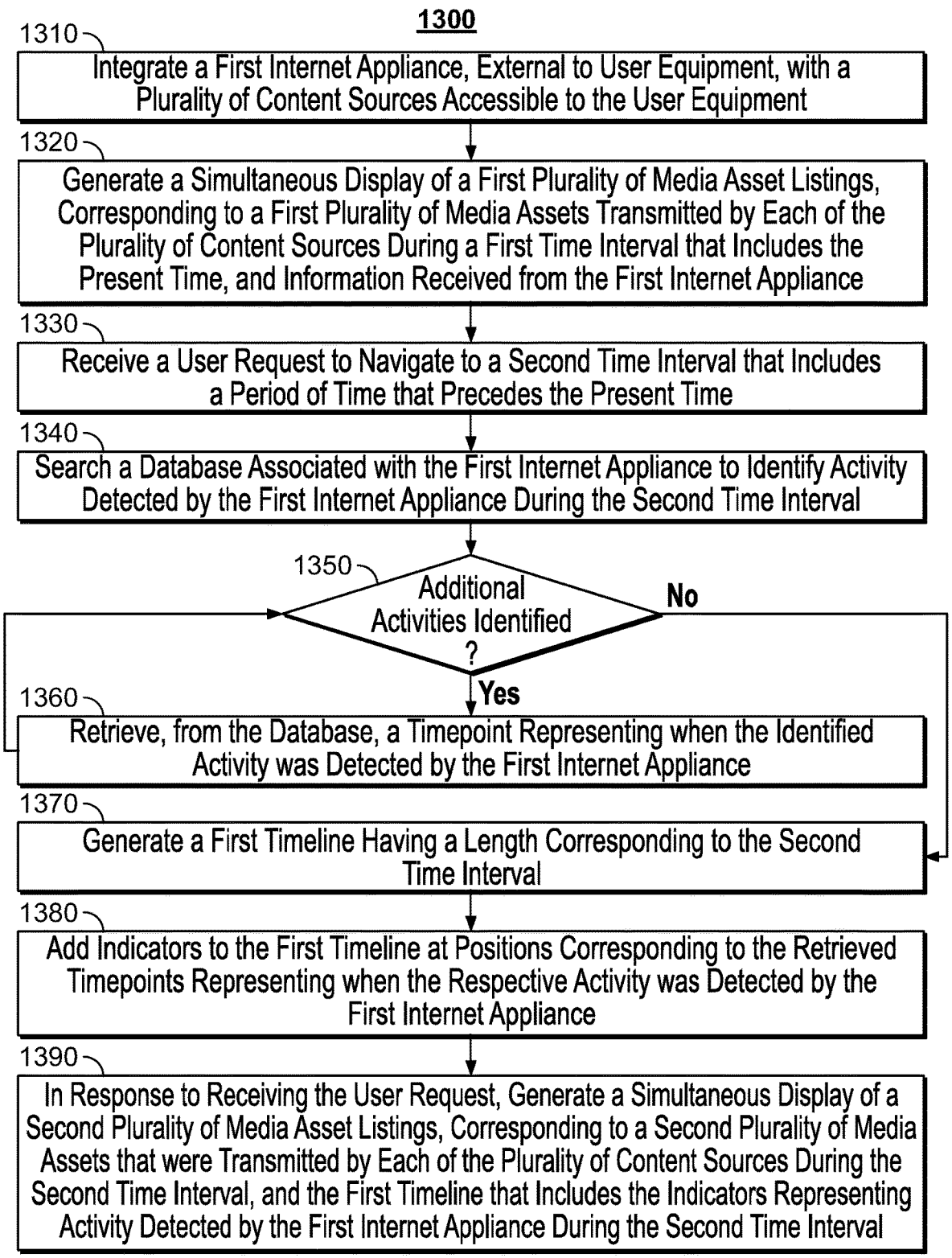

FIG. 13 is a flowchart of detailed illustrative process 1300 for displaying an Internet appliance timeline with content source media assets in accordance with some embodiments of the disclosure. It should be noted that process 1300 or any step thereof could be performed on, or provided by, any of the devices shown in FIGS. 10-11. For example, process 1300 may be executed by control circuitry 1004 (FIG. 10) as instructed by a media guidance application implemented on a user device (e.g., user equipment devices 1102, 1104, and/or 1106 (FIG. 11)) in order to display an Internet appliance timeline with content source media assets. In addition, one or more steps of process 1300 may be incorporated into or combined with one or more steps of any other process or embodiment described herein.

At step 1310, a first Internet appliance, external to user equipment, is integrated with a plurality of content sources accessible to the user equipment. For example, control circuitry 1004 may receive user input selecting a given Internet appliance (e.g., NEST camera) from first display region 150. In response to receiving a user selection of the NEST camera, control circuitry 1004 may assign an available virtual channel (e.g., virtual channel 102) to the NEST camera in the channel space that includes content source channels (e.g., television channels) and virtual channels (FIG. 1).

At step 1320, a simultaneous display of a first plurality of media asset listings, corresponding to a first plurality of media assets transmitted by each of the plurality of content sources during a first time interval that includes the present time, and information received from the first Internet appliance is generated. For example, control circuitry 1004 may generate for display screen 600 which includes media asset listings 610 (e.g., "Gotham" transmitted by FOX, "The Voice" transmitted by NBC, "2 Broke Girls" transmitted by CBS, etc.) and virtual channels 620 representing information received from the appliances (e.g., NEST camera) with identifying information associated with each appliance (FIG. 6).

At step 1330, a user request to navigate to a second time interval that includes a period of time that precedes the present time is received. For example, control circuitry 1004 may receive a user input navigating a cursor to the left a number of times to shift the time interval that is being displayed (e.g., from the current time to the past or previous time).

At step 1340, a database associated with the first Internet appliance is searched to identify activity detected by the first Internet appliance during the second time interval. For example, control circuitry 1004 may identify a server associated with the NEST camera (e.g., a NEST server). Control circuitry 1004 may determine the past time interval that is being displayed (e.g., time interval 8-9:30 PM) and generate a query to a database hosted by the NEST server that includes the determined time interval, user account information associated with the NEST camera, a unique identifier (e.g., address) of the NEST camera, and a command requesting a list of activities detected during the time interval. In some implementations, control circuitry 1004 may transmit the query to a database hosted locally by the user equipment which may have recorded the various activities over the virtual channel and/or directly to a database stored on the selected NEST camera. Control circuitry 1004 may receive back the information (including the activity type and timepoint) requested from the database after the database is searched based on the query. Control circuitry 1004 may determine the timepoint received from the database and the type of activity that was detected by the appliance.

At step 1350, a determination is made as to whether additional activities have been identified. In response to determining that additional activities have been identified, the process proceeds to step 1360. Otherwise, the process proceeds to step 1370. For example, control circuitry 1004 may process the retrieved information from the database to determine whether any other activities were detected during the given time interval.

At step 1360, a timepoint representing when the identified activity was detected by the first Internet appliance is retrieved. For example, control circuitry 1004 may process all of the retrieved activities detected during the time interval and assign timepoints to each detected activity.

In step 1370, a first timeline having a length corresponding to the second time interval is generated. For example, control circuitry 1004 may generate a timeline that represents a one hour and 30 minute interval (e.g., between 8-9:30 PM).

In step 1380, indicators are added to the first timeline at positions corresponding to the retrieved timepoints representing when the respective activity was detected by the first Internet appliance. For example, control circuitry 1004 may identify where along the timeline each of the detected activities belongs, based on the assigned timepoints. The timepoints may also represent a duration rather than a fixed point in time when the activity is detected over the course of several minutes/hours. Control circuitry 1004 may also determine the type of activity that was detected (e.g., motion or audio) and select an indicator type (e.g., circle or line) associated with that type of activity. Control circuitry 1004 may add the selected indicator to the timeline at the assigned timepoint or range of timepoints.

At step 1390, in response to receiving the user request, a simultaneous display of a second plurality of media asset listings, corresponding to a second plurality of media assets that were transmitted by each of the plurality of content sources during the second time interval, and the first timeline that includes the indicators representing activity detected by the first Internet appliance during the second time interval is generated. For example, control circuitry 1004 may generate for display screen 700 which includes media asset listings 730 (e.g., "Gotham" transmitted by FOX, "The Voice" transmitted by NBC, "2 Broke Girls" transmitted by CBS, etc.) that were transmitted in a previous time interval (e.g., 8-9:30 PM, where the current time is 10 PM) and virtual channels 740 representing timeline 742 indicating activity detected by the appliances (e.g., NEST camera) (FIG. 7).

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 13.

Figure 14:
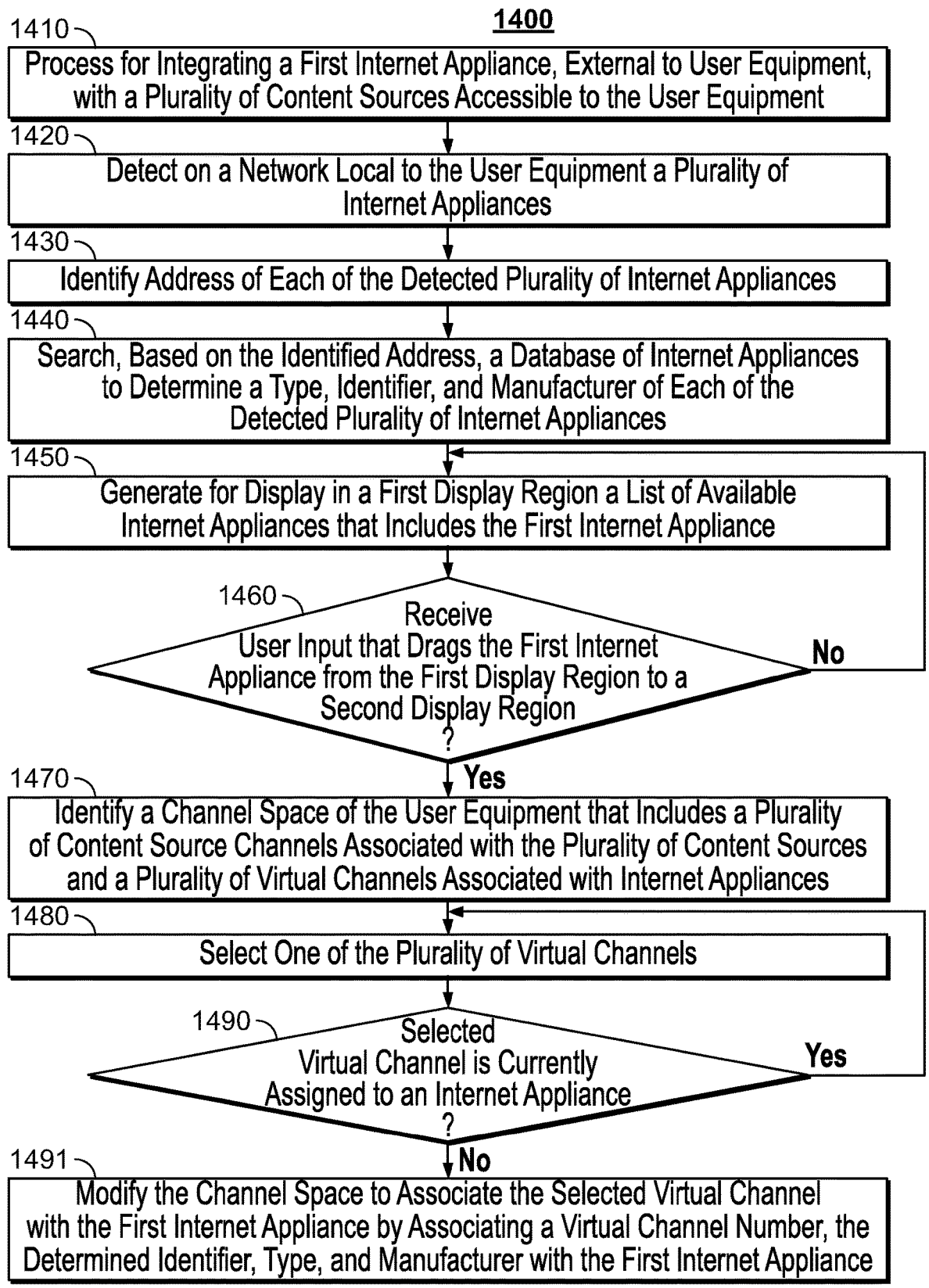
FIG. 14 is a flowchart of a detailed illustrative process for integrating an Internet appliance with a plurality of content sources in accordance with some embodiments of the disclosure.

FIG. 14 is a flowchart of detailed illustrative process 1400 for integrating an Internet appliance with a plurality of content sources in accordance with some embodiments of the disclosure. It should be noted that process 1400 or any step thereof could be performed on, or provided by, any of the devices shown in FIGS. 10-11. For example, process 1400 may be executed by control circuitry 1004 (FIG. 10) as instructed by a media guidance application implemented on a user device (e.g., user equipment devices 1102, 1104, and/or 1106 (FIG. 11)) in order to integrate an Internet appliance with a plurality of content sources. In addition, one or more steps of process 1400 may be incorporated into or combined with one or more steps of any other process or embodiment described herein.

At step 1410, a process for integrating a first Internet appliance, external to user equipment, with a plurality of content sources accessible to the user equipment begins. For example, control circuitry 1004 may execute a subroutine that integrates the appliance with content sources on the user equipment.

At step 1420, a plurality of Internet appliances are detected on a network local to the user equipment. For example, control circuitry 1004 may issue a discovery request (e.g., in accordance with a UPnP protocol) to a local network associated with the user equipment. Each device coupled to the network (e.g., each Internet appliance connected to the home network) may respond (e.g., according to the UPnP protocol) with parameters identifying the appliance including its capabilities, address information, manufacturer, type, etc.

At step 1430, the address of each of the detected plurality of Internet appliances is identified. For example, control circuitry 1004 may receive and store in storage 1008 the address and parameters of each responding appliance.

At step 1440, based on the identified address, a database of Internet appliances is searched to determine a type, identifier, and manufacturer of each of the detected plurality of Internet appliances. For example, control circuitry 1004 may transmit a query to a local or remote database with an address or some of the information contained in the parameters it receives from each appliance. Multiple databases may be searched (e.g., one for each type/manufacturer of the appliances that is detected). The database may return to control circuitry 1004 information associated with each address of each detected appliance. For example, the database may provide an API associated with each appliance to control circuitry 1004. The API may be used by control circuitry 1004 to further communicate/instruct the given appliance to perform a function (e.g., retrieve a timeline, perform trick play, provide recorded video/audio, provide activity information, etc.). The database may alternatively or in addition provide an address or contact information of another aggregating server that hosts multiple APIs of various appliances. In such circumstances, control circuitry 1004 may communicate with each of the appliances via the aggregating server by issuing commands to the aggregating server and having the aggregating server use its locally stored APIs to communicate with the appliances or servers associated with the appliances.

At step 1450, a list of available Internet appliances that includes the first Internet appliance is generated for display in a first display region. For example, control circuitry 1004 may generate for display in first display region 150 identifiers of each detected appliance including some or all of the information contained in the parameters each appliance transmitted to control circuitry 1004 (FIG. 1).

At step 1460, a determination is made as to whether user input that drags the first Internet appliance from the first display region to a second display region has been received. In response to determining that, the process proceeds to step 1470. Otherwise, the process proceeds to step 1450. For example, control circuitry 1004 may determine if the user positioned a cursor over a given identifier that is displayed in region 150, pressed a command button (e.g., a SELECT button) and dragged or pressed a directional arrow to a second display region 130 and stopped pressing the command button or pressed the command button again to stop the dragging operation (FIG. 1)

At step 1470, a channel space of the user equipment that includes a plurality of content source channels associated with the plurality of content sources and a plurality of virtual channels associated with Internet appliances is identified. For example, control circuitry 1004 may retrieve from storage 1008 a list of channels and their associated content source or appliance. For example, control circuitry 1004 may retrieve a list that indicates channels 1-99 are assigned to channels that transmit content from a content provider source (e.g., television channel) to a plurality of users at scheduled time intervals and virtual channels 100-110 are available to assign to local Internet appliances.

At step 1480, one of the plurality of virtual channels is selected. For example, control circuitry 1004 may analyze the assignments of virtual channels 100-110 to determine whether any of the channels is not assigned to an appliance. In particular, control circuitry 1004 may determine whether an appliance API, parameters, and/or address is associated with a given one of the virtual channels. Control circuitry 1004 may select one of the virtual channels that is available and not assigned or associated with any appliances. If all of the virtual channels are assigned, control circuitry 1004 may replace one of the assigned appliances based on a priority scheme with the appliance most recently selected by the user at step 1460. Alternatively, or in addition, control circuitry 1004 may prompt the user to select a given appliance to remove from the virtual channel assignment, and following confirmation of removal, control circuitry 1004 may associate the appliance selected at step 1460 with the removed assignment. Alternatively, or in addition, control circuitry 1004 may analyze the activity timelines (in the lifetime of the appliance or within a threshold period of time previous to the current time). Control circuitry 1004 may identify the appliance with the least amount of activity detected in the activity timeline and may automatically remove that appliance from the virtual channel that is assigned to the appliance. Control circuitry 1004 may then associate the appliance selected at step 1460 with the virtual channel that has become available.

At step 1490, a determination is made as to whether the selected virtual channel is currently assigned to an Internet appliance. In response to determining that the selected virtual channel is currently assigned to an Internet appliance, the process proceeds to step 1480 to select another virtual channel Otherwise, the process proceeds to step 1491.

At step 1491, the channel space is modified to associate the selected virtual channel with the first Internet appliance by associating a virtual channel number, the determined identifier, type, and manufacturer with the first Internet appliance. For example, control circuitry 1004 may store in storage 1008 the parameters and/or identifier of the selected appliance for the selected virtual channel.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 14.

Figure 15:
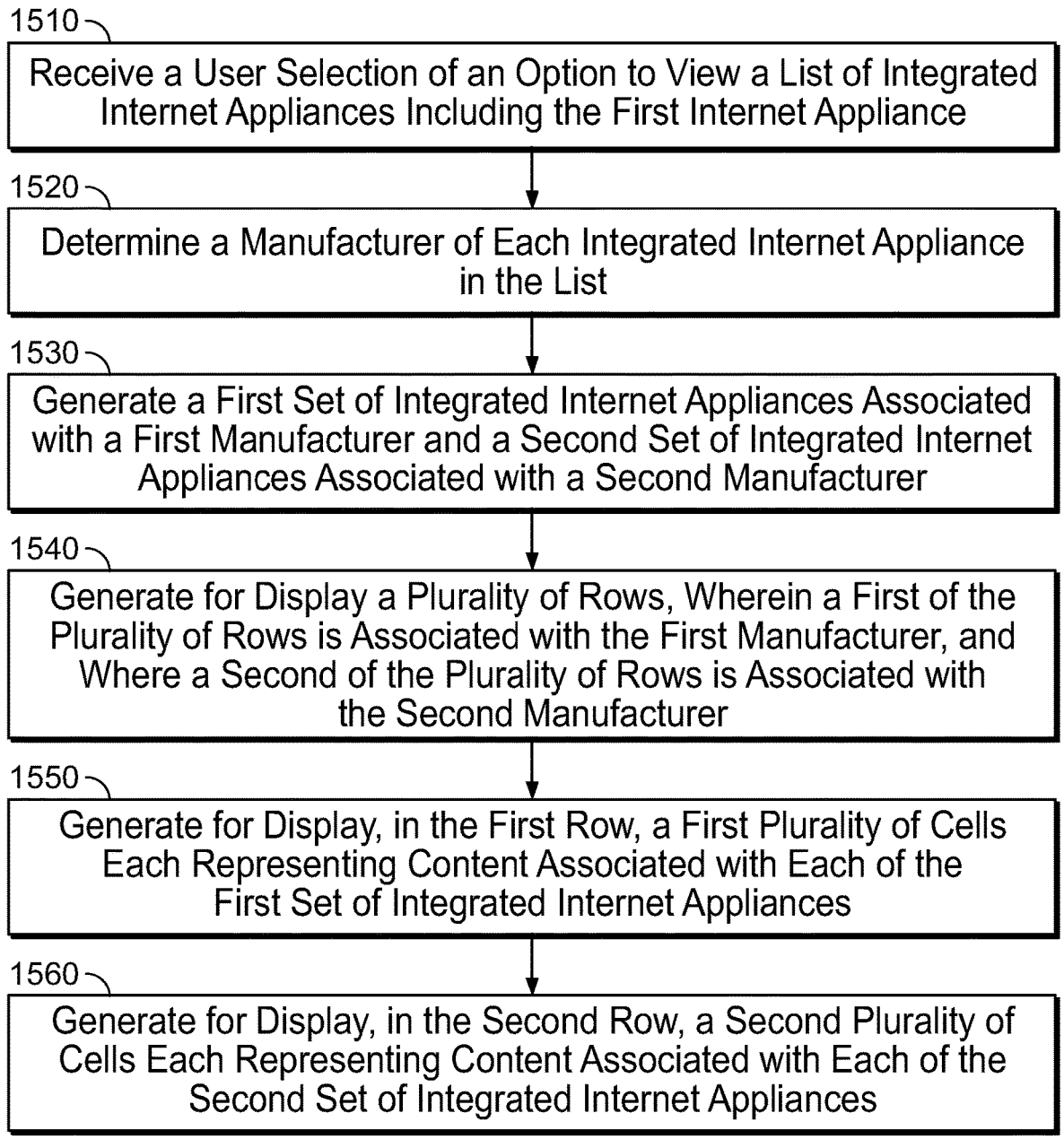
FIG. 15 is a flowchart of a detailed illustrative process for displaying Internet appliances based on a manufacturer in accordance with some embodiments of the disclosure.

FIG. 15 is a flowchart of detailed illustrative process 1500 for displaying Internet appliances based on a manufacturer in accordance with some embodiments of the disclosure. It should be noted that process 1500 or any step thereof could be performed on, or provided by, any of the devices shown in FIGS. 10-11. For example, process 1500 may be executed by control circuitry 1004 (FIG. 10) as instructed by a media guidance application implemented on a user device (e.g., user equipment devices 1102, 1104, and/or 1106 (FIG. 11)) in order to display Internet appliances based on a manufacturer. In addition, one or more steps of process 1500 may be incorporated into or combined with one or more steps of any other process or embodiment described herein.

At step 1510, a user selection of an option to view a list of integrated Internet appliances, including the first Internet appliance, is received. For example, control circuitry 1004 may receive a user selection of a SHOW APPLIANCES button on a remote control.

At step 1520, a manufacturer of each integrated Internet appliance in the list is determined. For example, control circuitry 1004 may analyze the virtual channels stored in storage 1008 to retrieve the parameters of each appliance associated with a given virtual channel. Control circuitry 1004 may process the parameters to identify the manufacturer of each appliance.

At step 1530, a first set of integrated Internet appliances associated with a first manufacturer and a second set of integrated Internet appliances associated with a second manufacturer are generated. For example, control circuitry 1004 may generate a list for each manufacturer that is determined. In each list, control circuitry 1004 may store the parameters (e.g., device ID, address, type, etc.) of each device associated with the given manufacturer associated with the list. For example, in a NEST list, control circuitry 1004 may store NEST camera 1, NEST camera 2, and NEST camera doorbell as the detected appliances and in a RING list, control circuitry 1004 may store RING camera 1 and RING doorbell as the detected appliances.

At step 1540, a plurality of rows is generated for display, wherein a first of the plurality of rows is associated with the first manufacturer, and where a second of the plurality of rows is associated with the second manufacturer. For example, control circuitry 1004 may display first row 510 associated with RING manufacturer and second row 520 associated with NEST manufacturer (FIG. 5).

At step 1550, a first plurality of cells, each representing content associated with each of the first set of integrated Internet appliances, is generated for display in the first row. For example, control circuitry 1004 may determine how many appliances are included in the first list. Control circuitry 1004 may generate a number of cells corresponding to the number of appliances in the first list. Control circuitry 1004 may display cells 512, 514 and 516 representing each appliance in the first list. In each cell, control circuitry 1004 may include content captured by each given appliance and/or parameters associated with each appliance and/or a timeline of activity detected by each appliance. For example, cell 512 may present video captured by the RING doorbell and cell 514 may present video captured by the RING camera in the living room.

At step 1560, a second plurality of cells, each representing content associated with each of the second set of integrated Internet appliances, is generated for display in the second row. For example, control circuitry 1004 may determine how many appliances are included in the second list. Control circuitry 1004 may generate a number of cells corresponding to the number of appliances in the second list. Control circuitry 1004 may display cells 522 and 524 representing each appliance in the first list. In each cell, control circuitry 1004 may include content captured by each given appliance and/or parameters associated with each appliance and/or a timeline of activity detected by each appliance. For example, cell 522 may present video captured by the NEST camera in the bedroom and cell 524 may present video captured by the NEST camera in the living room.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 15.

Figure 16:
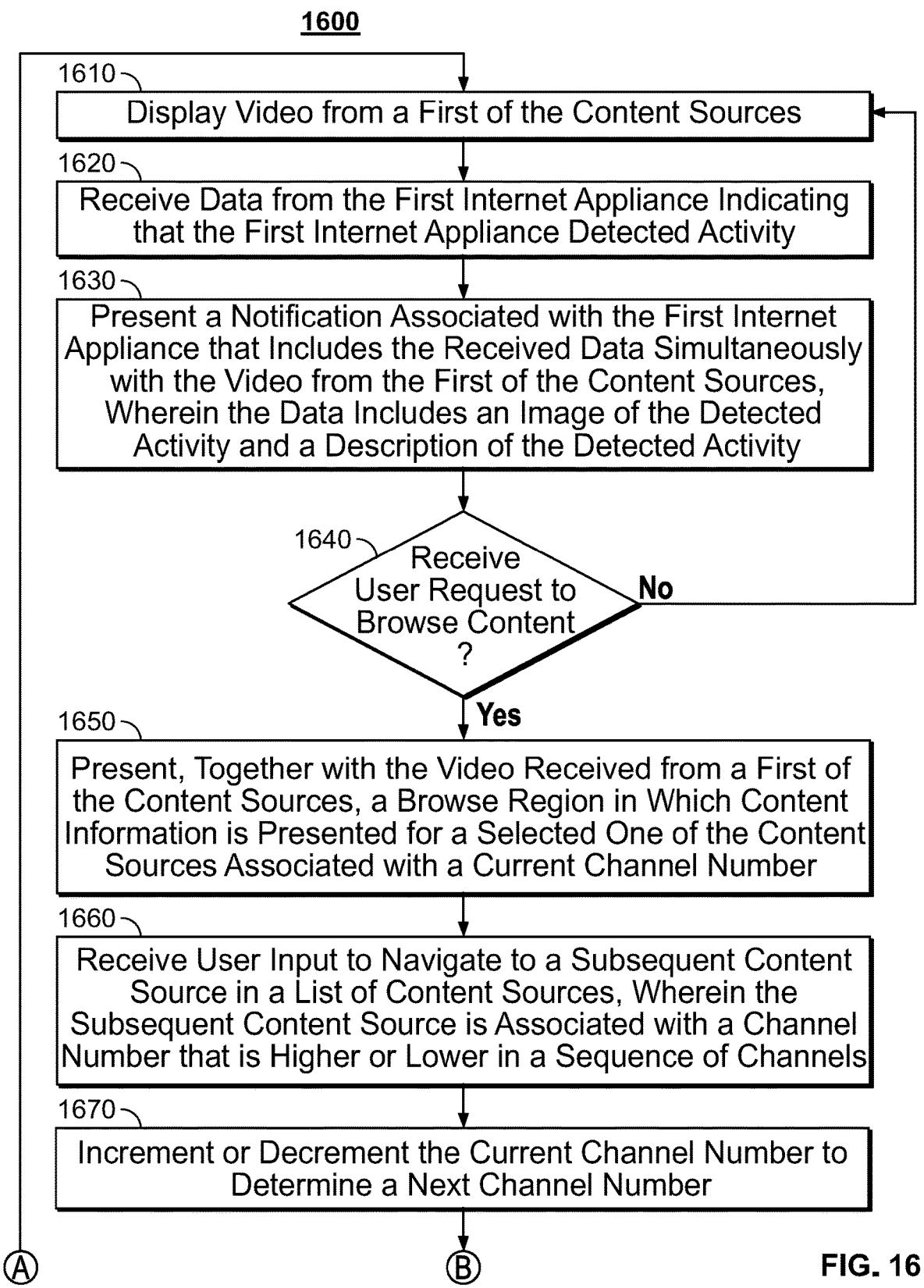
FIG. 16 is a flowchart of a detailed illustrative process for browsing Internet appliances in accordance with some embodiments of the disclosure.
Figure 16:
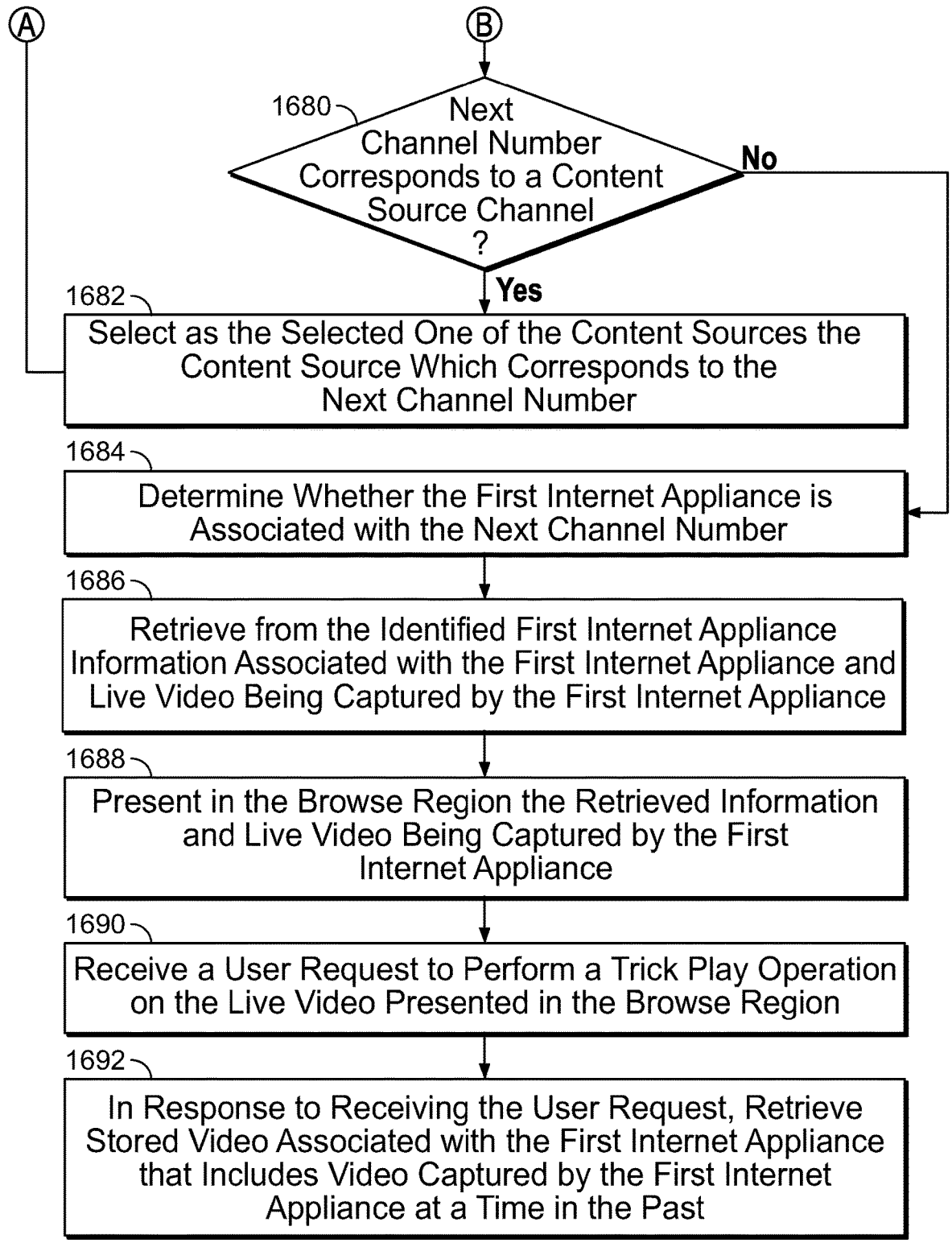

FIG. 16 is a flowchart of detailed illustrative process 1600 for browsing Internet appliances in accordance with some embodiments of the disclosure. It should be noted that process 1600 or any step thereof could be performed on, or provided by, any of the devices shown in FIGS. 10-11. For example, process 1600 may be executed by control circuitry 1004 (FIG. 10) as instructed by a media guidance application implemented on a user device (e.g., user equipment devices 1102, 1104, and/or 1106 (FIG. 11)) in order to browse Internet appliances. In addition, one or more steps of process 1600 may be incorporated into or combined with one or more steps of any other process or embodiment described herein.

At step 1610, video from a first of the content sources is displayed. For example, control circuitry 1004 may tune to a given channel (e.g., channel ABC) and present video 220 received over that channel that is broadcast to a plurality of users at a scheduled time (FIG. 2).

At step 1620, data from the first Internet appliance indicating that the first Internet appliance detected activity is received. For example, control circuitry 1004 may receive an indication from a RING doorbell that motion was detected by the appliance.

At step 1630, a notification associated with the first Internet appliance that includes the received data is presented simultaneously with the video from the first of the content sources, wherein the data includes an image of the detected activity and a description of the detected activity. For example, control circuitry 1004 may present notification 210 as an overlay on top of video 220 being displayed (FIG. 2).

At step 1640, a determination is made as to whether a user request to browse content has been received. In response to determining that, the process proceeds to step 1650. Otherwise, the process proceeds to step 1610. For example, control circuitry 1004 may determine whether the user pressed the up arrow or browse button on a remote control indicating that the user requests to browse content (e.g., content scheduled for transmission on other channels or content being captured by Internet appliances on virtual channels).

At step 1650, a browse region in which content information is presented for a selected one of the content sources associated with a current channel number is presented together with the video received from a first of the content sources. For example, control circuitry 1004 may present browse region 310 (FIG. 3), rows 510/520 (FIG. 5), and/or display 600/700 (FIGS. 6 and 7).

At step 1660, user input to navigate to a subsequent content source in a list of content sources, wherein the subsequent content source is associated with a channel number that is higher or lower in a sequence of channels, is received. For example, control circuitry 1004 may receive a user selection of the right arrow to navigate to subsequent channels in browse region 310 (FIG. 3) and/or the down arrow to navigate to subsequent channels in rows 510/520 (FIG. 5) and/or display 600/700 (FIGS. 6 and 7).

At step 1670, the current channel number is incremented or decremented to determine a next channel number. For example, control circuitry 1004 may determine the channel number or virtual channel number of the information presented currently in browse region 310. In particular, browse region 310 may currently be displaying information for content scheduled for transmission tomorrow at 3 PM on channel 99 (e.g., CBS) while video currently received on channel ABC is being presented. In such circumstances, the next channel number is determined to be virtual channel 100 if the user presses the left arrow button.

At step 1680, a determination is made as to whether the next channel number corresponds to a content source channel. In response to determining that the next channel number corresponds to a content source channel, the process proceeds to step 1682. Otherwise, the process proceeds to step 1684.

At step 1682, the content source that corresponds to the next channel number is selected as the selected one of the content sources.

At step 1684, it is determined whether the first Internet appliance is associated with the next channel number. For example, control circuitry 1004 may determine that the next channel (virtual channel 100) corresponds to an Internet appliance (e.g., RING doorbell).

At step 1686, information associated with the first Internet appliance and live video being captured by the first Internet appliance are retrieved from the identified first Internet appliance. For example, control circuitry 1004 may transmit a communication to the RING doorbell (e.g., either directly or through aggregation server or RING server) requesting live video and/or activity information.

At step 1688, the retrieved information and live video being captured by the first Internet appliance are presented in the browse region. For example, control circuitry 1004 may present an icon representing RING doorbell and/or live video being captured by the RING doorbell together with the video being received from the content source (FIG. 3).

At step 1690, a user request to perform a trick play operation on the live video presented in the browse region is received. For example, while the cursor is positioned over the RING doorbell in browse region 310, control circuitry 1004 may receive a user input requesting to rewind the video received from the RING doorbell.

At step 1692, in response to receiving the user request, stored video associated with the first Internet appliance that includes video captured by the first Internet appliance at a time in the past is retrieved. For example, control circuitry 1004 may access a local storage device that stores video received over the virtual channel to access previously captured points in time. For example, control circuitry 1004 may communicate with the RING doorbell (directly, via aggregation server, or RING server) to request stored video representing previously captured points in time. Control circuitry 1004 may present the retrieved stored video in browse region 310 in place of the live video that was being presented. The retrieved stored video may be presented together with the video currently received from the content source channel.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 16.

Figure 17:
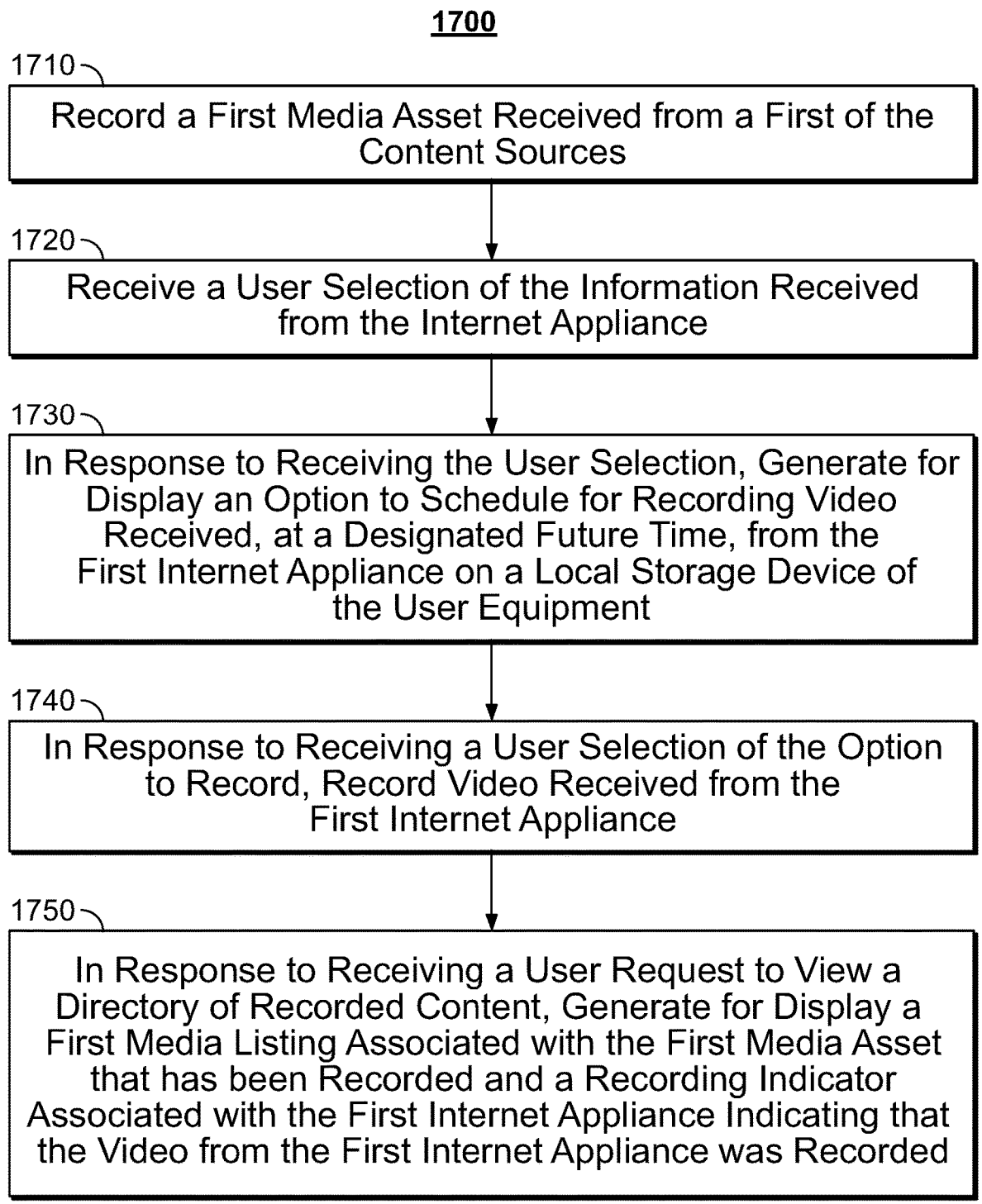
FIG. 17 is a flowchart of a detailed illustrative process for recording content from Internet appliances in accordance with some embodiments of the disclosure.

FIG. 17 is a flowchart of detailed illustrative process 1700 for recording content from Internet appliances in accordance with some embodiments of the disclosure. It should be noted that process 1700 or any step thereof could be performed on, or provided by, any of the devices shown in FIGS. 10-11. For example, process 1700 may be executed by control circuitry 1004 (FIG. 10) as instructed by a media guidance application implemented on a user device (e.g., user equipment devices 1102, 1104, and/or 1106 (FIG. 11)) in order to record content from Internet appliances. In addition, one or more steps of process 1700 may be incorporated into or combined with one or more steps of any other process or embodiment described herein.

At step 1710, a first media asset received from a first of the content sources is recorded. For example, control circuitry 1004 may receive a user request to record a program at a scheduled transmission time for a particular source (e.g., "Seinfeld" received from ABC channel at 7 PM tomorrow).

At step 1720, a user selection of the information received from the first Internet appliance is received. For example, control circuitry 1004 may receive a user selection of information 622 presented in screen 600 (FIG. 6). In particular, the user may navigate a cursor from highlighting the media asset listing ("The Bachelor" transmitted by ABC content source) down to highlight "Front Door" information received from RING doorbell. Control circuitry 1004 may receive a user selection of the SELECT button while highlighting "Front Door" information 622.

At step 1730, in response to receiving the user selection, an option to schedule for recording video received, at a designated future time, from the first Internet appliance on a local storage device of the user equipment is generated for display. For example, control circuitry 1004 may present recording options similar to options presented for a typical television program to schedule for recording content captured in the future or currently from the corresponding appliance (e.g., RING doorbell). The user may specify recording criteria for triggering the local recording of the content captured by the RING doorbell.

At step 1740, in response to receiving a user selection of the option to record, video received from the first Internet appliance is recorded. For example, control circuitry 1004 may access the video captured by the RING doorbell at the specified future time (e.g., tomorrow at 8 PM) or when the criteria is met and begin storing the content on a local storage device (e.g., the DVR) on which programs received from content sources are recorded.

At step 1750, in response to receiving a user request to view a directory of recorded content, a first media listing associated with the first media asset that has been recorded and a recording indicator associated with the first Internet appliance indicating that the video from the first Internet appliance was recorded are generated for display.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 17.

Figure 18:
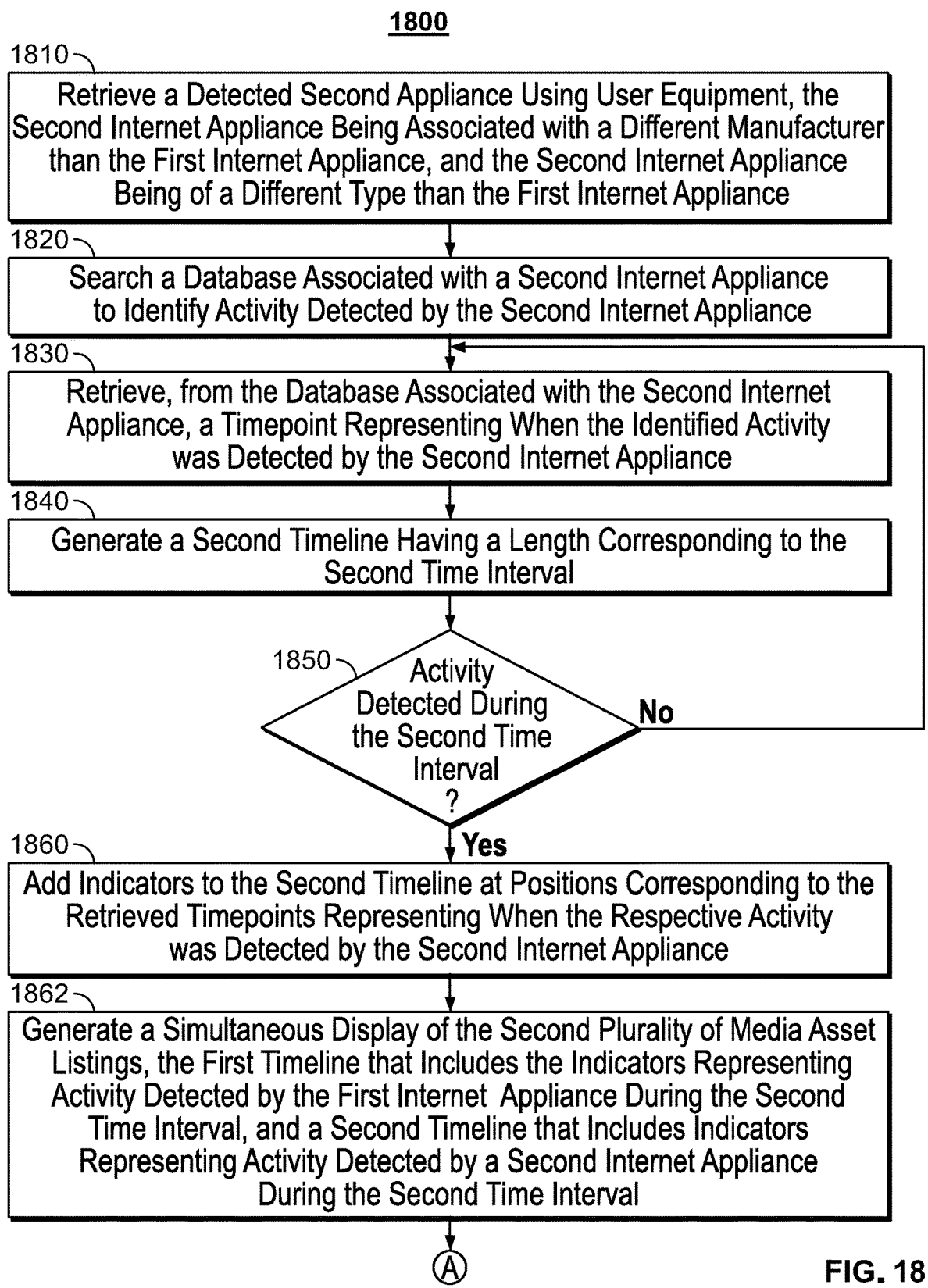
FIG. 18 is a flowchart of a detailed illustrative process for displaying content according to activity timelines from Internet appliances in accordance with some embodiments of the disclosure.
Figure 18:
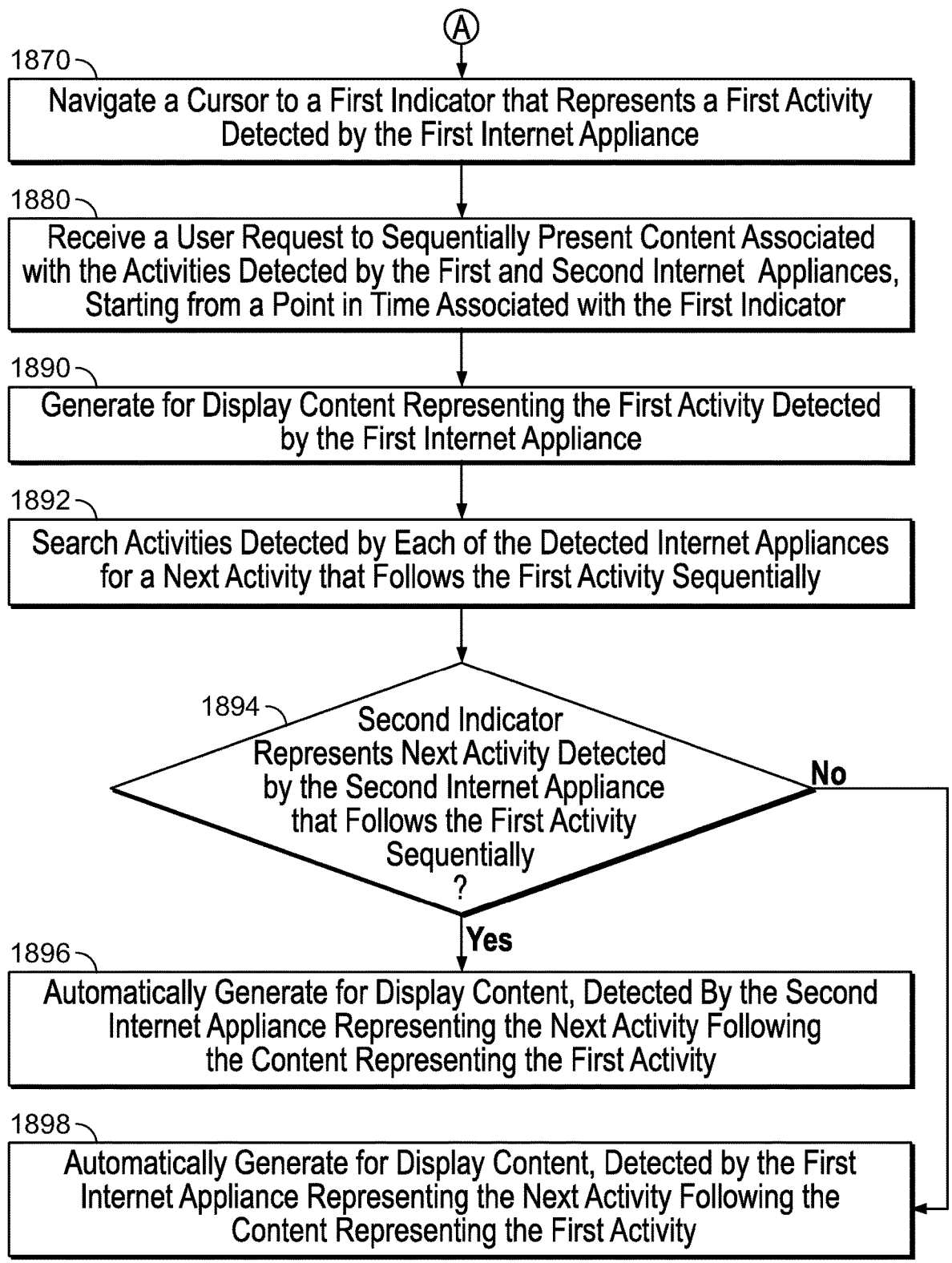

FIG. 18 is a flowchart of detailed illustrative process 1800 for displaying content according to activity timelines from Internet appliances in accordance with some embodiments of the disclosure. It should be noted that process 1800 or any step thereof could be performed on, or provided by, any of the devices shown in FIGS. 10-11. For example, process 1800 may be executed by control circuitry 1004 (FIG. 10) as instructed by a media guidance application implemented on a user device (e.g., user equipment devices 1102, 1104, and/or 1106 (FIG. 11)) in order to display content according to activity timelines from Internet appliances. In addition, one or more steps of process 1800 may be incorporated into or combined with one or more steps of any other process or embodiment described herein.

At step 1810, a detected second appliance is retrieved using user equipment, the second Internet appliance being associated with a different manufacturer than the first Internet appliance, and the second Internet appliance being of a different type than the first Internet appliance. For example, control circuitry 1004 may access storage 1008 to identify another appliance that was detected during discovery of local appliances (e.g., NEST camera or RING camera).

At step 1820, a database associated with a second Internet appliance is searched to identify activity detected by the second Internet appliance. For example, control circuitry 1004 may identify a server associated with the RING doorbell (e.g., a RING server). Control circuitry 1004 may determine the past time interval that is being displayed (e.g., time interval 8-9:30 PM) and generate a query to a database hosted by the RING server that includes the determined time interval, user account information associated with the RING camera, a unique identifier (e.g., address) of the RING doorbell, and a command requesting a list of activities detected during the time interval. In some implementations, control circuitry 1004 may transmit the query to a database hosted locally by the user equipment which may have recorded the various activities over the virtual channel and/or directly to a database stored on the selected RING doorbell. Control circuitry 1004 may receive back the information (including the activity type and timepoint) requested from the database after the database is searched based on the query. Control circuitry 1004 may determine the timepoint received from the database and the type of activity that was detected by the appliance.

At step 1830, a timepoint representing when the identified activity was detected by the second Internet appliance is retrieved from a database associated with the second Internet appliance. For example, control circuitry 1004 may process all of the retrieved activities detected during the time interval and assign timepoints to each detected activity.

At step 1840, a second timeline having a length corresponding to the second time interval is generated. For example, control circuitry 1004 may generate a timeline that represents a one hour and 30 minute interval (e.g., between 8-9:30 PM).

At step 1850, a determination is made as to whether activity is detected during the second time interval. In response to determining that activity is detected during the second time interval, the process proceeds to step 1860. Otherwise, the process proceeds to step 1830.

At step 1860, indicators are added to the second timeline at positions corresponding to the retrieved timepoints representing when the respective activity was detected by the second Internet appliance. For example, control circuitry 1004 may identify where along the timeline each of the detected activities belongs, based on the assigned timepoints. The timepoints may also represent a duration rather than a fixed point in time when the activity is detected over the course of several minutes/hours. Control circuitry 1004 may also determine the type of activity that was detected (e.g., motion or audio) and select an indicator type (e.g., circle or line) associated with that type of activity. Control circuitry 1004 may add the selected indicator to the timeline at the assigned timepoint or range of timepoints.

At step 1862, a simultaneous display of the second plurality of media asset listings, the first timeline that includes the indicators representing activity detected by the first Internet appliance during the second time interval, and a second timeline that includes indicators representing activity detected by a second Internet appliance during the second time interval is generated. For example, control circuitry 1004 may generate for display screen 700 which includes media asset listings 730 (e.g., "Gotham" transmitted by FOX, "The Voice" transmitted by NBC, "2 Broke Girls" transmitted by CBS, etc.) that were transmitted in a previous time interval (e.g., 8-9:30 PM, where the current time is 10 PM) and virtual channels 740 representing first timeline 742 indicating activity detected by the first appliance (e.g., NEST camera) and second timeline 744 indicating activity detected by the second appliance (e.g., RING doorbell) (FIG. 7).

At step 1870, a cursor is navigated to a first indicator that represents a first activity detected by the first Internet appliance. For example, control circuitry 1004 may receive a user input navigating a cursor to first indicator 710 representing motion detected by the first appliance.

At step 1880, a user request is received to sequentially present content associated with the activities detected by the first and second Internet appliances, starting from a point in time associated with the first indicator. For example, control circuitry 1004 may receive a user selection of a PLAY button on a remote control.

At step 1890, content representing the first activity detected by the first Internet appliance is generated for display. For example, control circuitry 1004 may access a storage device (local or remote on a server associated with the first appliance) to retrieve content captured by the appliance during the timepoint represented by first indicator 710 (FIG. 7).

At step 1892, activities detected by each of the detected Internet appliances are searched for a next activity that follows the first activity sequentially. For example, control circuitry 1004 may search all of the activity timelines displayed in screen 700 to identify the next chronological timepoint that sequentially follows the timepoint represented by first indicator 710.

At step 1894, a determination is made as to whether the second indicator represents the next activity detected by the second Internet appliance, that follows the first activity sequentially. In response to determining that the second indicator represents the next activity detected by the second Internet appliance that follows the first activity sequentially, the process proceeds to step 1896. Otherwise, the process proceeds to step 1898.

At step 1896, content, detected by the second Internet appliance representing the next activity following the content representing the first activity, is automatically generated for display. For example, indicator 712 may be determined to chronologically and sequentially follow the timepoint represented by the selected indicator 710. As a result, control circuitry may determine that indicator 712 represents activity detected by the second appliance and access a storage device (local or remote on a server associated with the second appliance) to retrieve content captured by the second appliance during the timepoint represented by second indicator 712 (FIG. 7).

At step 1898, content, detected by the first Internet appliance representing the next activity following the content representing the first activity, is automatically generated for display. For example, indicator 714 may be determined to chronologically and sequentially follow the timepoint represented by second indicator 712. As a result, control circuitry may determine that indicator 714 represents activity detected by the first appliance and access a storage device (local or remote on a server associated with the first appliance) to retrieve content captured by the second appliance during the timepoint represented by second indicator 714 (FIG. 7).

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 18.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted, the systems and/or methods described above may be applied to, or used in accordance with, other systems and/or methods.

What is claims is:

1. A method for navigating to activity information received from an appliance using a media guidance application, the method comprising:
    integrating a first Internet appliance, external to user equipment, with a plurality of content sources accessible to the user equipment, wherein the integrating comprises:
        detecting on a network local to the user equipment a plurality of Internet appliances;
        determining a type, identifier, and manufacturer of each of the detected plurality of Internet appliances based on an address of each of the detected plurality of Internet appliances;
        generating for display in a first display region a list of detected Internet appliances that includes the first Internet appliance;
        receiving user input that drags the first Internet appliance from the first display region to a second display region; and
        in response to the user input:
            identifying a channel space of the user equipment that includes a plurality of content source channels associated with the plurality of content sources and a plurality of virtual channels associated with Internet appliances;
            searching the virtual channels to identify a first virtual channel that is not currently assigned to an Internet appliance; and
            modifying the channel space to associate the first virtual channel with the first Internet appliance by associating a virtual channel number, the determined identifier, type, and manufacturer with the first Internet appliance;
    generating a simultaneous display of
        a first plurality of media asset listings, corresponding to a first plurality of media assets transmitted by each of the plurality of content sources during a first time interval that includes the present time, and information received from the first Internet appliance;
    receiving a user request to navigate to a second time interval that includes a period of time that precedes the present time; and
    in response to receiving the user request, generating a simultaneous display of a second plurality of media asset listings, corresponding to a second plurality of media assets that were transmitted by each of the plurality of content sources during the second time interval and a first timeline that includes indicators representing activity detected by the first Internet appliance during the second time interval.

2. The method of claim 1, wherein the first Internet appliance is a user Internet video camera, further comprising:
    presenting, together with video received from a first of the content sources, a browse region in which content information is presented for a second of the content sources associated with a current channel number;
    receiving user input to navigate to a subsequent content source in a list of content sources, wherein the subsequent content source is associated with a channel number that is higher or lower in a sequence of channels; and
    presenting in the browse region information associated with the first Internet appliance and live video being received by the first Internet appliance in response to determining that the first Internet appliance is a next content source in the list of content sources and is associated with a channel number that sequentially follows the current channel number being presented in response to the user input.

3. The method of claim 2 further comprising:
    receiving a user request to perform a trick play operation on the live video presented in the browse region; and
    in response to receiving the user request, retrieving stored video associated with the first Internet appliance that includes video captured by the first Internet appliance at a time in the past.

4. The method of claim 1 further comprising:
    receiving a user selection of an option to view a list of integrated Internet appliances including the first Internet appliance;
    determining a manufacturer of each integrated Internet appliance in the list;
    generating a first set of integrated Internet appliances associated with a first manufacturer and a second set of integrated Internet appliances associated with a second manufacturer;
    generating for display a plurality of rows, wherein a first of the plurality of rows is associated with the first manufacturer, and where a second of the plurality of rows is associated with the second manufacturer;
    generating for display, in the first row, a first plurality of cells each representing content associated with each of the first set of integrated Internet appliances; and
    generating for display, in the second row, a second plurality of cells each representing content associated with each of the second set of integrated Internet appliances.

5. The method of claim 1 further comprising:
    displaying video from a first of the content sources;
    receiving data from the first Internet appliance indicating that the first Internet appliance detected activity; and
    presenting a notification associated with the first Internet appliance that includes the received data simultaneously with the video from the first of the content sources, wherein the data includes an image of the detected activity and a description of the detected activity.

6. The method of claim 1 further comprising:
recording a first media asset received from a first of the content sources;
receiving a user selection of the information received from the first Internet appliance;
in response to receiving the user selection, generating for display an option to schedule for recording video received, at a designated future time, from the first Internet appliance on a local storage device of the user equipment;
in response to receiving a user selection of the option to record, recording video received from the first Internet appliance; and
in response to receiving a user request to view a directory of recorded content, generating for display a first media listing associated with the first media asset that has been recorded and a recording indicator associated with the first Internet appliance indicating that the video from the first Internet appliance was recorded.

7. The method of claim 1, wherein generating the simultaneous display of the second plurality of media asset listings further comprises:
searching a database associated with a second Internet appliance to identify activity detected by the second Internet appliance during the second time interval, wherein the second Internet appliance is associated with a different manufacturer than the first Internet appliance, and wherein the second Internet appliance is of a different type than the first Internet appliance;
for each identified activity, retrieving, from the database associated with the second Internet appliance, a timepoint representing when the identified activity was detected by the second Internet appliance;
generating a second timeline having a length corresponding to the second time interval;
adding indicators to the second timeline at positions corresponding to the retrieved timepoints representing when the respective activity was detected by the second Internet appliance; and
generating a simultaneous display of the second plurality of media asset listings, the first timeline that includes the indicators representing activity detected by the first Internet appliance during the second time interval, and the second timeline that includes the indicators representing activity detected by the second Internet appliance during the second time interval.

8. The method of claim 7, wherein the indicators included in the first and second timelines include a first plurality of indicators of a first type and a second plurality of indicators of a second type, wherein the first plurality of indicators represent a first type of activity detected at different points in time, wherein the second plurality of indicators represent a second type of activity detected at different points in time, wherein the first plurality of indicators are visually distinguished from the second plurality of indicators.

9. The method of claim 7 further comprising:
navigating a cursor to a first indicator that represents a first activity detected by the first Internet appliance;
receiving a user request to sequentially present content associated the activities detected by the first and second Internet appliances starting from a point in time associated with the first indicator;
generating for display content representing the first activity detected by the first Internet appliance;
determining that a second indicator that represents a second activity detected by the second Internet appliance is positioned between the first indicator and a third indicator that represents third activity detected by the first Internet appliance; and
in response to the determining, automatically generating for display content representing the second activity following the content representing the first activity.

10. A system for navigating to activity information received from an appliance using a media guidance application, the system comprising:
control circuitry configured to:
integrate a first Internet appliance, external to user equipment, with a plurality of content sources accessible to the user equipment by:
detecting on a network local to the user equipment a plurality of Internet appliances;
determining a type, identifier, and manufacturer of each of the detected plurality of Internet appliances based on an address of each of the detected plurality of Internet appliances;
generating for display in a first display region a list of detected Internet appliances that includes the first Internet appliance;
receiving user input that drags the first Internet appliance from the first display region to a second display region; and
in response to the user input:
identifying a channel space of the user equipment that includes a plurality of content source channels associated with the plurality of content sources and a plurality of virtual channels associated with Internet appliances;
searching the virtual channels to identify a first virtual channel that is not currently assigned to an Internet appliance; and
modifying the channel space to associate the first virtual channel with the first Internet appliance by associating a virtual channel number, the determined identifier, type, and manufacturer with the first Internet appliance;
generate a simultaneous display of
a first plurality of media asset listings, corresponding to a first plurality of media assets transmitted by each of the plurality of content sources during a first time interval that includes the present time, and
information received from the first Internet appliance;
receive a user request to navigate to a second time interval that includes a period of time that precedes the present time; and
in response to receiving the user request, generate a simultaneous display of a second plurality of media asset listings, corresponding to a second plurality of media assets that were transmitted by each of the plurality of content sources during the second time interval, and a first timeline that includes indicators representing activity detected by the first Internet appliance during the second time interval.

11. The system of claim 10, wherein the first Internet appliance is a user Internet video camera, and wherein the control circuitry is further configured to:
present, together with video received from a first of the content sources, a browse region in which content information is presented for a second of the content sources associated with a current channel number;
receive user input to navigate to a subsequent content source in a list of content sources, wherein the subsequent content source is associated with a channel number that is higher or lower in a sequence of channels; and present in the browse region information associated with the first Internet appliance and live video being captured by the first Internet appliance in response to determining that the first Internet appliance is a next content source in the list of content sources and is associated with a channel number that sequentially follows the current channel number being presented in response to the user input.

12. The system of claim 11, wherein the control circuitry is further configured to:

receive a user request to perform a trick play operation on the live video presented in the browse region; and in response to receiving the user request, retrieve stored video associated with the first Internet appliance that includes video captured by the first Internet appliance at a time in the past.

13. The system of claim 10, wherein the control circuitry is further configured to:

receive a user selection of an option to view a list of integrated Internet appliances including the first Internet appliance;

determine a manufacturer of each integrated Internet appliance in the list;

generate a first set of integrated Internet appliances associated with a first manufacturer and a second set of integrated Internet appliances associated with a second manufacturer;

generate for display a plurality of rows, wherein a first of the plurality of rows is associated with the first manufacturer, and where a second of the plurality of rows is associated with the second manufacturer;

generate for display, in the first row, a first plurality of cells each representing content associated with each of the first set of integrated Internet appliances; and generate for display, in the second row, a second plurality of cells each representing content associated with each of the second set of integrated Internet appliances.

14. The system of claim 10, wherein the control circuitry is further configured to:

display video from a first of the content sources;

receive data from the first Internet appliance indicating that the first Internet appliance detected activity; and present a notification associated with the first Internet appliance that includes the received data simultaneously with the video from the first of the content sources, wherein the data includes an image of the detected activity and a description of the detected activity.

15. The system of claim 10, wherein the control circuitry is further configured to:

record a first media asset received from a first of the content sources;

receive a user selection of the information received from the first Internet appliance;

in response to receiving the user selection, generate for display an option to schedule for recording video received, at a designated future time, from the first Internet appliance on a local storage device of the user equipment;

in response to receiving a user selection of the option to record, record video received from the first Internet appliance; and in response to receiving a user request to view a directory of recorded content, generate for display a first media listing associated with the first media asset that has been recorded and a recording indicator associated with the first Internet appliance indicating that the video from the first Internet appliance was recorded.

16. The system of claim 10, wherein the control circuitry is configured to generate the simultaneous display of the second plurality of media asset listings by:

searching a database associated with a second Internet appliance to identify activity detected by the second Internet appliance during the second time interval, wherein the second Internet appliance is associated with a different manufacturer than the first Internet appliance, and wherein the second Internet appliance is of a different type than the first Internet appliance;

for each identified activity, retrieving, from the database associated with the second Internet appliance, a timepoint representing when the identified activity was detected by the second Internet appliance;

generating a second timeline having a length corresponding to the second time interval;

adding indicators to the second timeline at positions corresponding to the retrieved timepoints representing when the respective activity was detected by the second Internet appliance; and generating a simultaneous display of the second plurality of media asset listings, the first timeline that includes the indicators representing activity detected by the first Internet appliance during the second time interval, and the second timeline that includes the indicators representing activity detected by the second Internet appliance during the second time interval.

17. The system of claim 16, wherein the indicators included in the first and second timelines include a first plurality of indicators of a first type and a second plurality of indicators of a second type, wherein the first plurality of indicators represent a first type of activity detected at different points in time, wherein the second plurality of indicators represent a second type of activity detected at different points in time, wherein the first plurality of indicators are visually distinguished from the second plurality of indicators.

18. The system of claim 16, wherein the control circuitry is further configured to:

navigate a cursor to a first indicator that represents a first activity detected by the first Internet appliance;

receive a user request to sequentially present content associated the activities detected by the first and second Internet appliances starting from a point in time associated with the first indicator;

generate for display content representing the first activity detected by the first Internet appliance;

determine that a second indicator that represents a second activity detected by the second Internet appliance is positioned between the first indicator and a third indicator that represents third activity detected by the first Internet appliance; and in response to the determining, automatically generate for display content representing the second activity following the content representing the first activity.

\* \* \* \* \*